US012388642B2

(12) United States Patent
True, Jr.

(10) Patent No.: US 12,388,642 B2
(45) Date of Patent: Aug. 12, 2025

(54) SYSTEMS, METHODS, AND DEVICES FOR GENERATION OF PEER VALIDATED GEOSPATIAL AND PROOF OF RECEPTION OF TRACKING DATA

(71) Applicant: John Gerard True, Jr., Gainesville, FL (US)

(72) Inventor: John Gerard True, Jr., Gainesville, FL (US)

( * ) Notice: Subject to any disclaimer, the term of this patent is extended or adjusted under 35 U.S.C. 154(b) by 279 days.

(21) Appl. No.: 18/092,127

(22) Filed: Dec. 30, 2022

(65) Prior Publication Data
US 2023/0327874 A1 Oct. 12, 2023

Related U.S. Application Data

(60) Provisional application No. 63/295,417, filed on Dec. 30, 2021.

(51) Int. Cl.
*H04L 9/30* (2006.01)
*G06Q 10/08* (2024.01)
(Continued)

(52) U.S. Cl.
CPC ............... *H04L 9/32* (2013.01); *G06Q 10/08* (2013.01); *H04L 9/008* (2013.01); *H04L 9/3247* (2013.01); *H04L 9/50* (2022.05); *H04L 2209/84* (2013.01)

(58) Field of Classification Search
CPC .... G06Q 50/30; G06Q 10/0631; G06Q 10/08; G06F 21/62; G06F 21/6218; G06F 16/23;
(Continued)

(56) References Cited

U.S. PATENT DOCUMENTS 10,939,405 B1    3/2021  Haleem et al.
11,038,964 B2    6/2021  Haleem et al.
(Continued)

FOREIGN PATENT DOCUMENTS

CA           3083806 C  *  8/2021  ......... G06F 16/2379
WO     WO-2023129749 A2  *  7/2023  ............. H04L 9/008

OTHER PUBLICATIONS

Dibaei, Mahdi, et al. "Investigating the prospect of leveraging blockchain and machine learning to secure vehicular networks: A survey." IEEE Transactions on Intelligent Transportation Systems 23.2 (2021): 683-700. (Year: 2021).*
Kumar, Prabhat, et al. "PPSF: A privacy-preserving and secure framework using blockchain-based machine-learning for IoT-driven smart cities." IEEE Transactions on Network Science and Engineering 8.3 (2021): 2326-2341. (Year: 2021).*
(Continued)

*Primary Examiner* — Cuong H Nguyen
(74) *Attorney, Agent, or Firm* — McCarter & English, LLP

(57) ABSTRACT

Described herein are systems and methods for validating received encrypted first data including position data and time data for a transportation vehicle. The system receives or accesses second data including second position and second time data of the transportation vehicle. The system determines a validity of the first data by performing operations on the encrypted first data or the encrypted first data and the second data to compare the encrypted first data and the second data. The system assigns a consensus score to the mining device based part on the comparison, and applies a signature function to the encrypted first position and first time data. The system then publishes the encrypted signed valid first position and first time data to a public transportation vehicle ledger.

18 Claims, 15 Drawing Sheets

(51) Int. Cl.
*H04L 9/32* (2006.01)
*H04L 9/00* (2022.01)

(58) Field of Classification Search
CPC .......... H04W 4/46; H04L 9/50; H04L 9/3239;
H04L 63/102; H04L 63/09
USPC ........................................................ 701/519
See application file for complete search history.

(56) References Cited

U.S. PATENT DOCUMENTS

| | | | |
|---|---|---|---|
| 11,443,246 B2* | 9/2022 | Gueye | G06Q 50/01 |
| 12,182,742 B1* | 12/2024 | Clark | G06Q 30/018 |
| 2016/0012465 A1* | 1/2016 | Sharp | G06Q 20/321 |
| | | | 705/14.17 |
| 2017/0053460 A1* | 2/2017 | Hauser | G07C 5/04 |
| 2018/0216946 A1* | 8/2018 | Gueye | G01C 21/3617 |
| 2019/0149524 A1 | 5/2019 | Bankston et al. | |
| 2019/0213260 A1 | 7/2019 | Bacarella et al. | |
| 2020/0351087 A1 | 11/2020 | Mccandlish et al. | |
| 2021/0035457 A1 | 2/2021 | Pennapareddy | |
| 2021/0081849 A1* | 3/2021 | Mezael | H04W 4/40 |
| 2021/0350211 A1 | 11/2021 | Dalli et al. | |

OTHER PUBLICATIONS

Ogundoyin, Sunday Oyinlola, and Ismaila Adeniyi Kamil. "An efficient authentication scheme with strong privacy preservation for fog-assisted vehicular ad hoc networks based on blockchain and neuro-fuzzy." Vehicular Communications 31 (2021): 100384. (Year: 2021).*

Zhang, Hanlin, et al. "Machine learning on cloud with blockchain: a secure, verifiable and fair approach to outsource the linear regression." IEEE Transactions on Network Science and Engineering 9.6 (2021): 3956-3967. (Year: 2021).*

Sowmya Kudva et al., Towards secure and practical consensus for blockchain based VANET; vol. 545, Feb. 4, 2021, pp. 170-187.*

Alkhodair, Ahmad J., Saraju P. Mohanty, and Elias Kougianos. "Consensus algorithms of distributed ledger technology—a comprehensive analysis." arXiv preprint arXiv:2309.13498 (2023).*

Alharbi, Fares, et al. "Intelligent transportation using wireless sensor networks blockchain and license plate recognition." Sensors 23.5 (2023): 2670.*

Martinez-Rendon, Cristhian, et al. "On the continuous contract verification using blockchain and real-time data." Cluster Computing 25.3 (2022): 2179-2201.*

International Search Report and Written Opinion for Application No. PCT/US2022/054402, dated Jun. 16, 2023, 26 pages.

* cited by examiner

SYSTEMS, METHODS, AND DEVICES FOR GENERATION OF PEER VALIDATED GEOSPATIAL AND PROOF OF RECEPTION OF TRACKING DATA

CROSS-REFERENCE TO RELATED PATENT APPLICATIONS

This application claims priority to U.S. Provisional Patent Application No. 63/295,417, filed on Dec. 30, 2021, the content of which is hereby incorporated by reference in its entirety.

BACKGROUND OF THE DISCLOSURE

As airspace, marine, and terrestrial traffic becomes filled with various types of vehicles from unmanned vehicles and drones to cargo ships and jet aircraft; for the safety and validity of assets, such as aircraft, the aircraft broadcasting its location will be critical to automated systems. Methods for flight and other vehicle routing and traffic management, such as artificial intelligence or machine learning based methods, will require accurate data to generate predictions for all assets, such as flights historically and in real-time.

Real-time monitoring or access to historical geo-spatial transportation tracking information is possible using a variety of public and/or private sources. This data can be collected using a wide variety of sensors at different scales of resolution in combination, and can be collected from publicly available web sites (e.g., with web scraping methods).

For the safety of the transportation industry, government regulators such as the US Federal Aviation Administration (FAA) and the US Coast Guard have implemented requirements for the broadcasting of a vessel or aircraft's current position in real time. For example, the United States and many other countries require aircraft to transmit Automatic Dependent Surveillance Broadcast (ADS-B data). The ADS-B data includes an aircraft's global positioning system (GPS) location, altitude, ground speed, and other data. As another example, large ships are required to broadcast their position with an automatic identification system (AIS). These signals are unencrypted and can be received by nearby receivers in real-time and recorded as historical geodata.

Online asset tracking website businesses have distributed low cost software defined radios capable of collecting, decoding and monitoring geodata to consumers/users, thereby creating an additional nodes in the tracking businesses' networks, from which the consumer/user can opt to share the collected and decoded geodata in real-time from vessels or aircraft over the internet to the website's central server. The hardware of many software defined radios are based upon an open-source design, along with open-source firmware to decode the raw signals such as 1090 MHz for ADS-B and 978 MHz or Marine AIS into positional data. In addition to these "localized" radio frequency reception of transportation geodata, FAA and some other regulators provide real time access to PUBLIC data streams over the internet. For example, the FAA System Wide Information Management (SWIM) program provides information via the SWIM Industry-FAA Team (SWIFT) web site, which can be used for flight tracking to provide real-time access to data from airports such as radar, weather, ground traffic, etc.

Some online tracking businesses' websites such as Flightaware, flightradar24, etc. provide privatized live tracking of airplanes. All sources, such as Flightaware, that opt to utilize FAA SWIM data, such as ADS-D data required to be broadcast by aircraft, are contractually required to follow FAA regulations limiting aircraft data displayed (LADD) rules and obfuscate the data of certain aircraft from public viewing, which can cause problems for automated systems making decisions from these websites based upon geodata across all industries. Various assets from all types of geodata are deliberately or accidentally obfuscated which can cause time-series calibration errors for these automated systems.

In some cases for airplanes, the prediction capability of the system will require access to obfuscated flight plans and identifiers to effectively route aircraft. Aircraft with obfuscated tracking signals such as dynamic HEX-ID which can be a code that is associated with a registration of the aircraft that changes each time the takes off and lands, or the FAA LADD program can cause errors for automated or artificial intelligence systems attempting to determine optimal flight routes.

The proper operation of automated systems monitoring geodata and the economic value itself of all ADS-B nodes operating correctly is critical to these flight tracking websites and their users, but the information provided by flight tracking websites can be vulnerable to direct hacking attacks, such as denial of service or spoofing, and inherent website failures such as the Facebook DNS shutdown in 2021. Although the ADS-B tracking websites rely upon their network of users to keep receivers connected to the internet and operating, these users are not compensated meritoriously for the quantity or unique data their receiver collects and shares using mostly open-source hardware and software components.

The management of privacy laws is a difficult task for human operators to perform manually, but can be difficult to automate due to the risk of errors and potential litigation. Privacy Laws in various jurisdictions, such as the California Consumer Privacy Act (CCPA), prevent breaches of geolocation data from individuals. Due to these risks of potential litigation, public databases which comprise potential privacy data, such as FAA LADD data, are often incomplete to protect individual's privacy.

Artificial intelligence systems such as risk management, traffic routing, etc. are built upon the training and testing on validated data, and if there is a missing portion of geodata such as obfuscated aircraft, vessels, and unmanned vehicles; this can cause errors in the predictive capabilities of such autonomous systems. Yet, it is critical for the privacy of these assets to remain intact, while remaining possible to integrate these obfuscated assets into the automated workflows of traffic planning, prediction, and management.

Although privacy systems put in place by regulators, such as the LADD system, are meant for privacy and safety, it is also used by malicious entities such as dictators, criminal organizations, and state actors to obfuscate their illicit movements.

Some permissionless blockchains and proof of coverage systems have been developed for deploying hardware democratically by compensating users for providing "Coverage" of RF signals in the 910 MhZ band (LoRaWan), however "proof of coverage" requires the transmission of encrypted signals to provide security and trust to the network, which itself is vulnerable to hardware tampering and does not allow for a transparent consensus mechanism for the network. In some conventional permissionless blockchain systems for proof of coverage systems, the mining hardware is proprietary to specific companies, and they alone hold the validation keys for new nodes to be added to the blockchain. There is a need for secure off the shelf hardware to selfvalidate and become part of the network, while mitigating malicious or erroneous data from nodes being added to the blockchain.

Although a blockchain is immutable and protected from historical modification, the adding of data to the blockchain is only as secure as the hardware/software that contributes this packetized information to the network and subsequent blockchain. In relation to real time data recording, this can result in spoofed or erroneous data being written to the blockchain, without a way to efficiently remove the data and any associated value earned by the false entity from the ledger.

Some conventional permissionless blockchain systems for proof of coverage systems have been vulnerable to gaming of the system where users acquire multiple hardware devices and strategically spoof their location in order to fraudulently "provide coverage" to a geographical area. This spoofing and subsequent theft occurs daily and cannot be reversed from the blockchain effectively. This gaming of compensation can be performed geographically anywhere on the planet through GPS spoofing, and strategic positioning of hotspots in proximity to each other, without providing any actual "coverage" to the blockchain.

Proof of Coverage systems based upon encrypted signals are especially vulnerable to hardware tampering, cloning, or side channel and man in the middle attacks. The hardware tampering can be either the spoofing of coverage or in addition to probing of hardware through contactless optical probing enabling users to drastically modify the hardware's broadcast power, break encryption, or write unvalidated data to the block-chain. For a quantum system to accurately model and spoof the data generated by the aggregate randomness of the estimated 40,000 daily movements of FAA regulated aircraft with complete accuracy would be impossible.

Proof of Work systems such as Nakamoto's Bitcoin are less vulnerable to hardware and software attacks as the algorithm for contributing to the networks is completely democratic, but can be dissolved through quantum supremacy.

Regulators set in place the standards such as ADS-B for aircraft, AIS for Marine vessels, Remote ID for unmanned drones; while there still remains no standards or automated methods of peer consensus for validating this trusted real-time geodata and compensating users for providing valid "proof of reception" of an asset's regulatory broadcasts.

If enough software defined radio hardware is deployed across the ground underneath an airspace, a decentralized network of the software defined radio hardware can be created that can be used to track the position and time of transportation vehicles as they move throughout space. A private corporation is building, installing and maintaining a nationwide network of ADS-B ground receivers in the United States. Typically, these ground receivers are located at, near, or are in direct communication with airports, as the system has an effective operating range of roughly 100 to 150 miles. Since approximately 2015, ground receivers sufficient to provide coverage for virtually the entire airspace over the continental U.S. have been in place.

However, as drone delivery and unmanned vehicle logistics become integrated into daily life, there will be a finer resolution of coverage required across the entire United States, not just where airports are present in order to accurately and safely monitor drone and unmanned vehicle movements in real-time across states, cities, and neighborhoods.

Drones will fly at lower altitudes, while unmanned terrestrial vehicles will have even further reduced broadcasting range; and therefore the current coverage and reception for general and commercial aviation will be wholly inadequate for providing thorough coverage.

Meanwhile drones are lighter in weight and limited in their hardware payload; and this will decrease the overall broadcast range of the onboard electronics possible, thereby increasing the ground-based reception requirements for receivers. Deploying reliable radio frequency hardware is expensive, difficult, and can be wasteful if not optimized for geography, population, and noise; electronics designs are often based upon ASIC devices and are limited in their ability to be reconfigured for new applications. New systems for tracking transportation vehicles are needed.

SUMMARY

A proof of reception of tracking data system is presented. The system includes a mining device that includes an antenna coupled to a software defined radio, and a first processor configured to or programmed to read one or more instructions held in memory to encrypt first data including first position and first time data for a transportation vehicle, the first position and first time data obtained from at least one signal emitted from the transportation vehicle and received via the antenna. The processor is also configured to or programmed to transmit the encrypted first data for validation. The system also includes a validation device, the validation device including a second processor configured to or programmed to read one or more instructions held in memory to receive the encrypted first data from the mining device via the communication interface, receive or access second data including second position and second time data for the transportation vehicle; and determine a validity of the first data by performing operations on the encrypted first data or on the encrypted first data and the second data to compare the encrypted first data and the second data. The second processor can be configured or programmed to determine a validity of the first position and first time data based at least in part on the comparison of the first data and the second data, assign a consensus score to the mining device based at least in part on the validity of the first position and first time data, apply a signature function to the encrypted first position and first time data, where the first position and first time data is determined to be valid, to obtain signed valid encrypted first position and first time data, and publish the signed valid encrypted first position and first time data to a public transportation vehicle ledger. A validation device is presented. The validation device includes a processor configured to or programmed to read one or more instructions held in memory to receive encrypted first data from a mining device, the first data including first position and first time data for a transportation vehicle. The processor is further configured to receive or access second data including second position and second time data for the transportation vehicle. The processor is further configured to determine validity of the first data by performing operations on the encrypted first data or on the encrypted first data and the second data to determine a relationship between the first data and the second data. The processor is further configured to determine a validity of the first data by performing operations on the encrypted first data or on the encrypted first data and the second data to compare the encrypted first data and the second data. The processor is further configured to assign a consensus score to the mining device based at least in part on the comparison of the first data and second data. The processor is further configured to apply a signature function to the encrypted first position and first time data, where the first position and first time data is determined to be valid, to obtain encrypted signed valid first position and first time data. The processor is further configured to publish the encrypted signed valid first position and first time data to a public transportation vehicle ledger.

A non-transitory computer-readable medium is presented. The non-transitory computer-readable medium stores computer-executable instructions which when executed by at least one processor, cause the at least one processor to perform the operation of receiving encrypted first data from a mining device, the first data including first position and first time data for a transportation vehicle. The computer-executable instructions further cause the at least one processor to perform the operation of receiving or accessing second data including second position and second time data for the transportation vehicle. The computer-executable instructions further cause the at least one processor to perform the operation of determining validity of the first data by performing operations on the encrypted first data or on the encrypted first data and the second data to determine a relationship between the first data and the second data. The computer-executable instructions further cause the at least one processor to perform the operation of determining a validity of the first data by performing operations on the encrypted first data or on the encrypted first data and the second data to compare the encrypted first data and the second data. The computer-executable instructions further cause the at least one processor to perform the operation of assigning a consensus score to the mining device based at least in part on the comparison of the first data and second data. The computer-executable instructions further cause the at least one processor to perform the operation of applying a signature function to the encrypted first position and first time data, where the first position and first time data is determined to be valid, to obtain encrypted signed valid first position and first time data. The computer-executable instructions further cause the at least one processor to perform the operation of publishing the encrypted signed valid first position and first time data to a public transportation vehicle ledger.

A method for validating a device is presented. The method includes receiving encrypted first data from a mining device, the first data including first position and first time data for a transportation vehicle. The method includes receiving or accessing second data including second position and second time data for the transportation vehicle. The method includes determining validity of the first data by performing operations on the encrypted first data or on the encrypted first data and the second data to determine a relationship between the first data and the second data. The method includes determining a validity of the first data by performing operations on the encrypted first data or on the encrypted first data and the second data to compare the encrypted first data and the second data. The method includes assigning a consensus score to the mining device based at least in part on the comparison of the first data and second data. The method includes applying a signature function to the encrypted first position and first time data, where the first position and first time data is determined to be valid, to obtain encrypted signed valid first position and first time data. The method includes publishing the encrypted signed valid first position and first time data to a public transportation vehicle ledger.

BRIEF DESCRIPTION OF THE DRAWINGS

These and other features and advantages of the present invention will be more fully understood by reference to the following detailed description in conjunction with the attached drawings in which like reference numerals refer to like elements throughout the different views.

DETAILED DESCRIPTION

Figure 1:
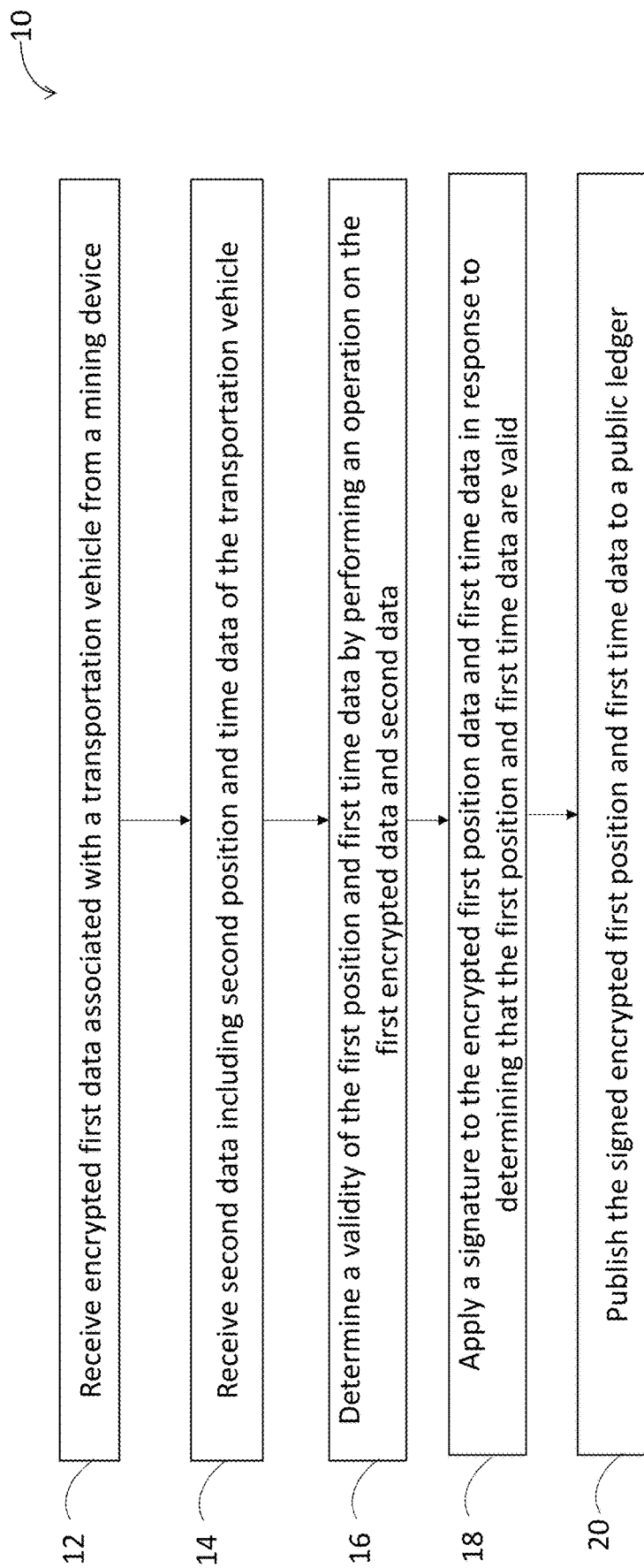
FIG. 1 is a flow chart for validating received transportation vehicle data, in accordance with some embodiments of the disclosure.

While various embodiments of the invention have been shown and described herein, it will be clear to those skilled in the art that such embodiments are provided by way of example only. Numerous variations, changes, and substitutions may occur to those skilled in the art without departing from the invention. It may be understood that various alternatives to the embodiments of the invention described herein may be employed.

As used in the specification and claims, the singular form "a," "an," and "the" include plural references unless the context clearly dictates otherwise. It will be further understood that the terms "comprises" and/or "comprising," or "include" and/or "including," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Conventional tracking of transportation vehicles has been via expensive software that is heavily customized for very specific purposes and can only can track one type of transportation vehicle. For example, aircraft are conventionally tracked using expensive ground receivers, such as airport surveillance radar, that are specifically designed to collect aircraft position and time data only. They are secure and difficult to hack or tamper with. Satellites are also used at times when the aircraft is in airspace where there no ground receivers as in the case when the aircraft is traveling over a large body of water. The satellites are also secure and difficult to hack or tamper with. Further, the position and time data of the aircraft are broadcast by the aircraft on frequencies that are reserved solely for tracking aircraft, and so the ground receivers and satellites receivers are tuned to receive signals operating at the frequencies for tracking aircraft.

In the case of ship, boat, or other marine vessels there are also ground based receivers that can receive position and time data associated with the ship, boat, or marine vessels in addition to GPS data. However these ground based receivers only receive position and time data associated with the ship, boat, or marine vessels on a frequency that is designated for receiving position and time data for ships, boats, or marine vessels.

Because both marine and aircraft tracking systems have receivers that are specifically tuned operate on frequencies to track marine vessels and aircraft, and because there are so few of them in the world, the cost to operate two separate systems can become prohibitively expensive. An alternative would be a receiver that is tuned to receive signals that operate within the frequency ranges that aircraft position and time data are transmitted on and the frequency ranges that marine vessel position and time data are transmitted on, and which is also less expensive to deploy and operate than the conventional tracking systems for aircraft and marine vessels. Software defined radios that can receive the position and time data on the frequencies that aircraft and marine vessels transmit tracking data on can be deployed relatively inexpensively and in greater number that conventional receivers currently used to track aircraft and marine vessels. Hundreds to thousands software defined radios can be deployed across a geographic region thereby providing better resolution and more accurate information because of the density of the number of software defined radios in the geographic area. Because the software defined radios can be deployed in large numbers across a geographic area, they can form a decentralized network where each of the software defined radios in the decentralized network can communicate with one another.

Not only does the decentralized network provide redundancy should a software defined radio fail, but it also provides a means by which a processor (e.g. a reconfigurable processor), that is communicatively coupled to a software defined radio, can not only process position and time data received from aircraft but also position and time data from marine vessels and drones. Because the software defined radios form a decentralized network, and they each have ability to communicate with each other, the processors that are communicatively coupled to the software defined radios, they can compare the position and time data that they each receive to other position or time data that they receive from peer software defined radios. By doing this, the decentralized network of software defined radios can validate the position and time data that is being received and shared with other software defined radios in the decentralized network is accurate. Such a decentralized network would not only be more resilient, but it would also be cost effective and provide a means by which the position and time data that is being received from aircraft and marine vessels can be validated real-time to ensure that the aircraft or marine vessel is accurately being tracked. The combination of the software defined radio and the neuromorphic processor can form what is called a mining device in accordance with some embodiments.

Some embodiments provide an automated system for tracking data that determines what data should be protected and is not subject to human error, and provides additional protections for the database of sensitive data. Privacy Preserving Neural Networks (PPNNs) using Homomorphic Encryption (HE) techniques, or other privacy retention systems such as federated learning, zero knowledge proofs, can enable the analysis of this public sensitive data without compromising the privacy of individuals in accordance with some embodiments.

Some embodiments employ neuromorphic hardware that is capable of reprogramming its operation after deployment to the field, iteratively improving the hardware configuration, and possess the inherent security of design which can reconfigure itself upon sensing hardware or software tampering. Neuromorphic computing platforms such as IBM's TrueNorth processor could also be used to perform the same operations as an ASIC but with higher efficiencies in accordance with some embodiments.

As the computational requirements of the future A.I. applications will require parallel processing, validated nodes with spare neuromorphic computing resources can be used for data offload. Techniques such as Fog Computing of Fog Computing as a Service with require trusted computation without compromising the privacy of data, but with a trusted central database or ledger to view, modify, and add to the ledger or blockchain in accordance with some embodiments.

As quantum computing and Shor's algorithm threatens the future of cryptography and subsequently blockchain consensus mechanisms, there is a need for consensus mechanisms not based upon encryption alone, which are non-deterministic. Deterministic methods and systems are vulnerable to being overtaken by quantum computing techniques, while nondeterministic systems have inherent randomness and thereby are resistant to quantum computing "attacks". The inherent randomness of regulatory aircraft and marine vessels on a daily basis could provide a non-deterministic set of data that can be used for validating peer consensus.

There are many peer consensus methods for validating nodes in the network such as "Delegated" Proof of adaptions, Proof of Authority, Proof of Trust, Proof of Rec, Proof of Stake, Proof of Elapsed Time, Proof of Bandwidth, practical Byzantine Fault Tolerance (pBFT), Blockchain reputation based consensus (BRBC), etc. BRBCs are unlike most of the existing consensus mechanisms, however, are constrained by low efficiency and high energy consumption. For example, the Blockchain Reputation-Based Consensus (BRBC) mechanism is through which a node must have the reputation score higher than a given network trust threshold before being allowed to insert a new block in the chain. A randomly-selected set of judges monitors the behaviour of each node involved in the consensus and updates the node reputation score. Every cooperative behaviour results in a reward, and a noncooperative or malicious behaviour results in a punishment. BRBC also uses the reputation score to revoke access to nodes with a reputation score below a given threshold.

In some embodiments described herein, a "Proof of Reception" based secure tamper resistant hardware blockchain system is based upon peer validation from unencrypted regulatory signals such as those from commercial aircraft to be able to provide a trusted framework for decentralized open-source asset tracking with secure hardware. In some embodiments, users can participate in a decentralized non-fungible tokens marketplace based upon the minting of tokens from validated geospatial data.

In some embodiments, Proof of Work, Stake, Authority, Trust, Reputation can all be enhanced through Proof of Reception by providing additional validation through cryptographic and peer consensus by verifying real time signals from the trusted ADS-B, AIS, Remote ID, etc. networks. These real time signals are detectable using inexpensive off the shelf hardware, but are often stronger than GPS signals, and themselves can be used for triangulation using transmissions from at least three (3) sources, while remaining less susceptible to spoofing due to the dynamic nature of aircraft, marine, or drone positional broadcasts. In regions where GPS signal is weak or threatened by spoofing, but positional broadcasts from ADS-B, AIS, or Remote ID are prevalent, this form of triangulation can be more accurate and secure.

Some embodiments provide a proof of reception of tracking data system that includes mining devices with software defined radios to receive signals emitted from transportation vehicles including position and time data, and that encrypt the position and time data and transmit the encrypted position and time data for validation. The proof of reception of tracking data system also includes a validation device that receives the encrypted position and time data from the mining device and receives or accesses second position and time data, and performs operations on the encrypted position and time data and the second position and time data to determine the validity of the encrypted and assign a consensus score to the mining device based at least in part on the encrypted position and time data. The validation device can apply a signature function to the validated first position and time data and publish the signed valid encrypted position and time data to a public transportation ledger. Some embodiments provide a validation device for validating encrypted position and time data received from a mining device. Some embodiments provide a mining device including a software defined radio that generated encrypted (e.g., homomorphically encrypted) position and time data for a transportation vehicle based on a radio signal received from the transportation vehicle. In some embodiments, the mining device has passive and/or active features to deter or detect tampering with the received position and time data.

FIG. 1 illustrates the process 100 for validating encrypted position and time data received from a mining device that has been selected to validate the received position and time data. This mining device can be referred as a validation node or validation device. At block 12 the validation device can receive encrypted first data associated with the transportation vehicle from a mining device that has received one or more signal including first data that includes first position and first time data. A processor in the mining device can encrypt the first data that includes first position and first time data of the transportation vehicle that has been received on an antenna that is coupled to the processor in the mining device. After the validation device receives the encrypted first data, the validation device can receive second data including second position and time data of the transportation vehicle at block 14. The second data can be received before or after the first data is received. After receiving the second data the validation device can determine whether the first data is valid by performing an operation on the first encrypted data and the second data (block 16). The result of the comparison can be that the first position and time data is identical to the second data, that the first position and time data is consistent with the second data, or that the first position and time data is inconsistent with the second data. In some embodiments, the second data can include multiple different data sets obtained from multiple different sources (e.g., from multiple different other mining devices).

After the validation device has determined that the first data is valid as a result of performing the operation on the first encrypted data and the second data, the validation device can then apply a signature at block 18 to the encrypted first position data and the first time data. The signature applied to the encrypted first position data and the first time data indicates that the first data is valid. The validation device can then publish the signed encrypted first position and first time data to a public ledger at block 20.

Some collected data can be analyzed with methods capable of detecting text and objects in imagery, video, and webpages. In some embodiments, these methods for detecting test and objects in imagery, video and webpages can include artificial intelligence methods, for example, convolutional neural networks, deep learning, etc.

Additionally, transportation assets often have markings or registration numbers such as license plates, vessel name, etc. This information can be obtained from an image of the transportation asset processed by image processing, machine learning, template matching, etc. and can be combined with GPS data from device that obtained the image to create a geo data tag of the asset, thereby, creating a timestamped image correlating to position, which can be aggregately used to provide a method to correlate objects in physical space to a record in digital form.

The advent of the internet of things has enabled access to low cost devices capable of collecting, decoding, and monitoring geodata using hardware such as software defined radios, cameras. High resolution cameras are available at low cost in combination with processors able to analyze imagery and video data in realtime, while Lidar sensors are still expensive but are commercially available.

Figure 2:
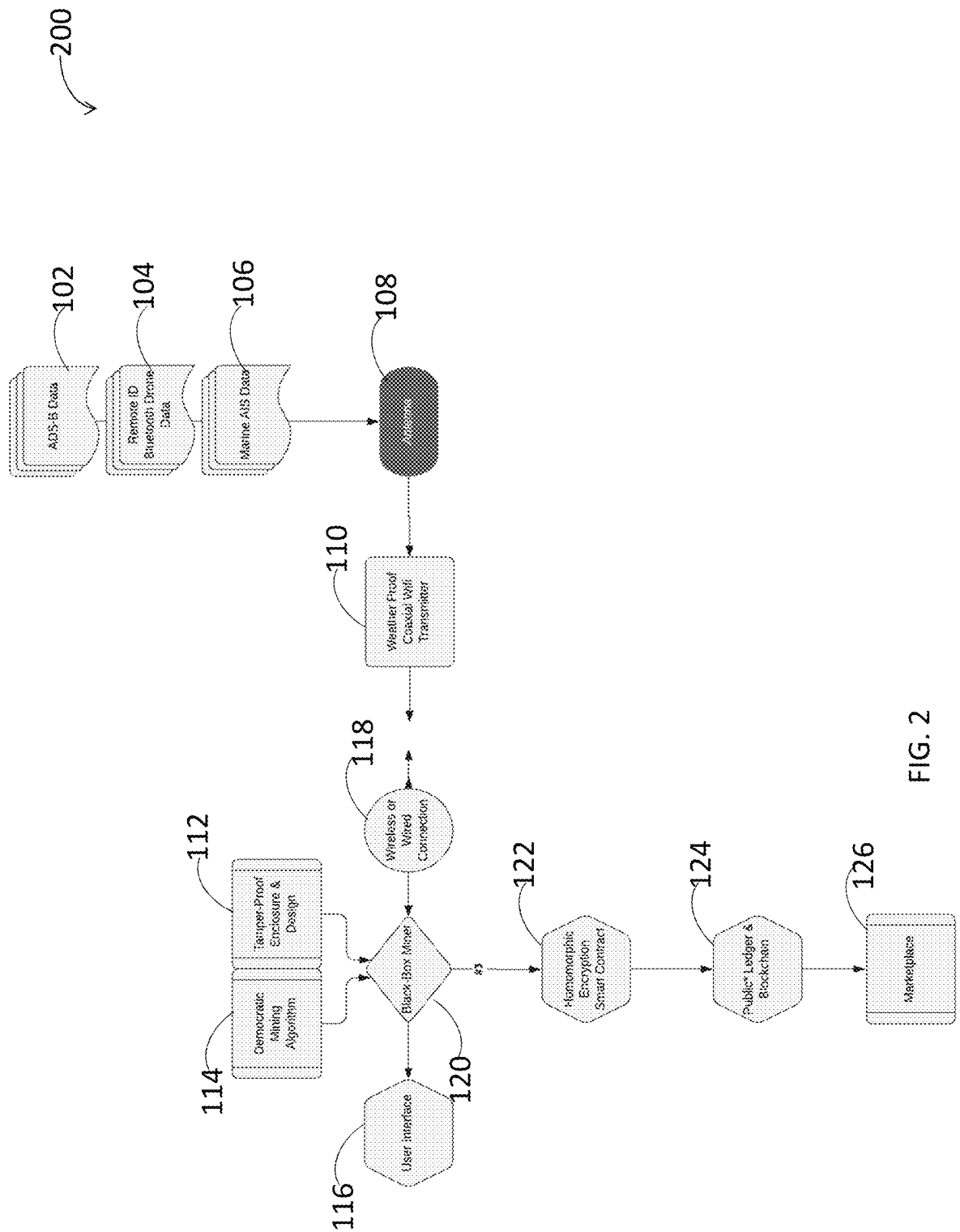
FIG. 2 is a flow diagram illustrating a process of generating homomorphically encrypted transportation vehicle data and publishing the homomorphically encrypted transportation vehicle data to a public ledger, in accordance with some embodiments of the disclosure.

FIG. 2 illustrates a system 200 for publishing homomorphically encrypted transportation vehicle data to a public ledger in accordance with some embodiments. The system 100 can include antenna 108 that detects or receives one or more transportation vehicle signals associated with Automatic Dependent Surveillance-Broadcast (ADS-B) data 102, Remote ID Bluetooth Drone Data 104, and/or Marine Automatic Identification System (AIS) data 106 in accordance with some embodiments. The transportation vehicle signals can include signals associated with other or additional sources in some embodiments. In countries other than the United States, the signals detected or received may have a different format and may be associated with different entities or different systems. The ADS-B data 102, Remote ID Bluetooth Drone Data 104, and Marine AIS data 106 includes position and time information associated airplanes operating in different airspaces across the globe, drones operating in different airspaces across the globe, and ships operating in different maritime waters across the globe.

The signals associated with the ADS-B data 102 can be detected by the antenna 108 on a frequency of 978 or 1090 MHz, the signals associated with the Remote ID Bluetooth Drone Data 104 can be detected by the antenna 108 within a frequency range of 2400 to 2483.5 MHz, and the signals associated with the Marine AIS 106 data can be detected by the antenna 108 on a frequency of frequency of 161.975 MHz and 162.025 MHz. These frequency ranges may be different for different countries. This received data (e.g., transportation vehicle data) may be described as asset tracking data, and is based on the raw unencrypted transmissions of these assets (e.g., transportation vehicles) and their positional data which can be collected by antennas of the required frequency. In some embodiments, the antenna can be communicatively coupled to a weather proof coaxial wireless or wired transmitter 110 that converts the received signals into a coaxial wired signal or wireless signal that can be transmitted to a wireless or coaxial wired connection 118 of a mining device (black box miner 120).

In some embodiments, the black box miner 120 can include a tamper-proof enclosure and design that can detect when the black box miner 120 is being opened or one or more components therein have been modified or removed.

In some embodiments, the black box miner 120 can include a processor or multiple processors that can execute a democratic mining algorithm that causes processor(s) to apply a homomorphic encryption algorithm to the position and time data associated with the ADS-B data 102, Remote ID Bluetooth Drone Data 104, and Marine AIS data 106 so that the data can be analyzed by other mining devices while preserving the privacy of the actual ADS-B data 102, Remote ID Bluetooth Drone Data 104, and Marine AIS data 106. Among the benefits of homomorphic encryption is that mathematical operations can be performed on data that is homomorphically encrypted without decrypting the data. In some embodiments, the processor or processors of the black box miner that perform homomorphic encryption include a neuromorphic processor.

In some embodiments, the system 100 includes a user interface 116 user interface associated with a computer, handset (mobile phone), other computing device and/or may include one or more of a monitor, button and light emitting diodes (LES). Some examples of different interfaces are depicted as a collection of different user interfaces 1210 in FIG. 13. In some embodiments, the user interface can be used by a user to load firmware and software related to the democratic mining algorithm 114 and/or one or more deep learning modules that can be executed by the processor (e.g., the neuromorphic processor) to predict one or more actions associated with transportation vehicles (e.g., airplanes, drones, or ships) based on the received encrypted data (e.g., ADS-B data 102, Remote ID Bluetooth Drone Data 104, and Marine AIS data 106).

The black box miner 120 can apply homomorphic encryption algorithm to the received ADS-B data 102, Remote ID Bluetooth Drone Data 104, and Marine AIS data 106 thereby creating the homomorphically encrypted data, which may be incorporated into a smart contract. A smart contract is program, that may be stored on a blockchain, and that runs or executes when predetermined conditions are met. In some embodiments, the homomorphically encrypted data associated with the received ADS-B data 102, Remote ID Bluetooth Drone Data 104, and Marine AIS data 106 can be published to a ledger on a permissionless blockchain 124 after the homomorphically encrypted data has been validated by a validator node. In some embodiments, after the homomorphically encrypted data has been published to the ledger on the permissionless blockchain 124, other mining devices can purchase the homomorphically encrypted data for analysis and to predict certain actions associated with the transportation vehicles (airplanes, drones, or ships, e.g. vessels) that generated the data.

Figure 3:
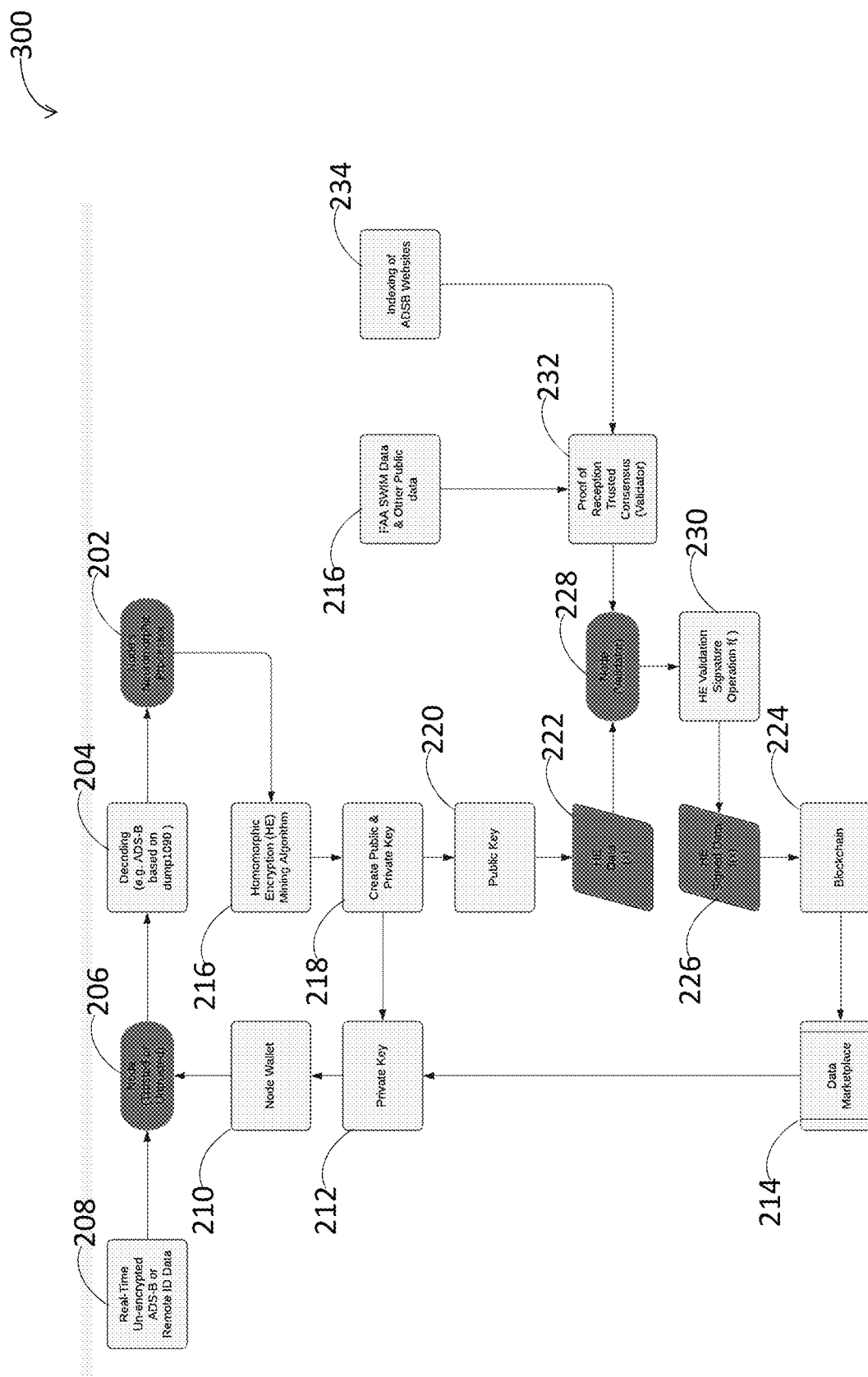
FIG. 3 is a flow diagram illustrating a process of validating homomorphically encrypted transportation vehicle data, in accordance with some embodiments of the disclosure.

FIG. 3 is a flow diagram illustrating the process of validating homomorphically encrypted transportation vehicle data, in accordance with some embodiments of the disclosure. Process 300 includes mining device (node 206) which can be either a trusted mining device or a untrusted mining device. The node 206 can receive real time un-encrypted ADS-B or Remote ID data 208 that has been broadcast by airplanes (e.g., ADS-B data 102) or drones (e.g., Remote ID Bluetooth Drone Data 104). The real time un-encrypted ADS-B or Remote ID data 208 can include position and time data associated with the airplanes or drones when it is broadcast in accordance with some embodiments. In some embodiments data associated with the position and time at which the data is broadcast by ships, boats, or vessels (e.g., Marine AIS data 106) can be received. In some embodiments, other types or formats of data from other transportation vehicles may be received.

Although FIG. 3 and other example embodiments are primarily explained with respect to DS-B data, Remote ID data, or AIS data for illustrative purposes, one of ordinary skill in the art in view of the present disclosure will understand that embodiments are not limited to ADS-B data, Remote ID data or marine AIS data, and that other types of data including position data broadcast or transmitted from vehicles or transportation vehicles may be employed in connection with any embodiments.

In some embodiments, node 206 can decode the received data (e.g., ADS-B or Remote ID data 208) on a RF front end processor, and the RF front end processor can send the decoded ADS-B or Remote ID data to the neuromorphic processor 202 in node 206. The neuromorphic processor 202 can apply the homomorphic encryption mining algorithm 216 to the decoded received data (e.g. ADS-B or Remote ID data) after which the neuromorphic processor 202 can generate a public key, that can be used by other mining devices to encrypt data that they can send to the node 206, and a private key that the node 206 can use to encrypt the decoded ADS-B or Remote ID based on the homomorphic encryption mining algorithm. The node 206 can store the private key 212 in a secure storage location in the node 206 called a node wallet 210. The node 206 can then broadcast the public key 220 to all other mining devices that are a part of the same network, as well as the decoded received ADS-B or Remote ID data.

A system can include a validator node 228, which is a mining device that has been selected to validate that the received ADS-B or Remote ID data 208 is correct and if there is network consensus. In some embodiments, the validator node 228 can receive the encrypted ADS-B or Remote ID data which can be expressed as HE Data (x) 222 and can perform operations upon the HE Data (x) 222 to determine if the data has been spoofed, contains errors, or is deceptive in any way. The validator node 228 determines if the HE Data (x) 222 is valid by comparing the HE Data (x) 222 against data from "trusted" nodes, geographically nearby, which previously, currently, or are expected to be in the trajectory of the transportation vehicle that is being tracked, through the use of electromagnetic and time of flight simulation such as Monte Carlo or Point Spread Function calculation in some embodiments. The validator node 228 can also use "trusted" data from regulatory bodies such as the Federal Aviation Administration (FAA) System Wide Information Management Industry-FAA Team (SWIFT) and other public data 216 system which provides public data about aircraft operations in some embodiments. The SWIFT data can include take-off and landing data, ground traffic data, weather data, flight routing data associated with an airplane. Other data that is publicly available that can also be used to by the validator 228 to validate that the received ADS-B or Remote ID data 208 is correct, is information scraped from indexed webpages (indexing of ADS-B websites 234) that include similar information to that is published in the SWIFT portal.

In some embodiments, through the use of predictive algorithms, the regulatory data can be used to estimate the expected ADS-B data values to be transmitted from given aircraft between takeoff and landing, or for AIS, leaving and entering port through modelling, simulation, deep learning agents, etc. In some embodiments, satellite imagery can also be used on a daily or weekly basis to provide further validation about the position and time data collected by the node 206 as an airplane moves between airports, or as a ship, boat, or vessel moves between ports. The trajectories of transportation vehicles can be set within constraints of traffic regulations such as FAA horizontal and vertical spacing to determine a relative threshold for the probability of valid signals in accordance with some embodiments. Other means of verification such as radar, lidar, optical, auditory, seismic, etc. can also be used to provide validation.

In some embodiments, the validator node 228 can execute a proof of reception trusted consensus 232 operation in which the validator node 228 issues a consensus score to the node 206 based at least in part on whether the ADS-B or Remote ID data that the node 206 has shared with the validator 228 is correct. In some embodiments, the consensus score is based at least in part on the amount of data shared, adjusted by a multiplier which is calculated from the given transportation vehicle's value. The transportation vehicle value is based at least in part on the operating resources (e.g., fuel) required by the transportation vehicle and the size of the transportation vehicle. For example, the operating resources required to service and operate a large cargo airplane (e.g., a Boeing 747) will be greater than the operating resources required to service and operate a small crop dusting airplane (e.g., a Cessna 172). In some embodiments, the consensus score can also be a function of "uniqueness" of the transportation vehicle while it is in operation. In some embodiments, the uniqueness can be based at least in part on an unplanned path that the transportation vehicle takes between a point of origin and a point of destination. Yet in still in other embodiments, the uniqueness value can also be based at least in part on an emergency associated with the transportation vehicle. Further still in other embodiments, the consensus score can be based at least in part on a manifest associated with the transportation vehicle. The consensus score multiplier associated with a commercial aircraft will be greater than the multiplier associated with that of private aviation due to the higher level of regulatory scrutiny of commercial aircraft. Because of the additional scrutiny applied to commercial aircraft, the likelihood with which erroneous transmissions or faulty equipment will be generated by commercial aircraft is lower than it would be for private aircraft. Also because commercial aircraft must adhere to a stringent operating schedule, it is also less likely that erroneous data will be generated because mining nodes, including validator nodes, will know the scheduled and estimated takeoff and landing times associated with commercial aircraft. In contrast, the scheduled and estimated takeoff and landing times associated with private aircraft can vary significantly, thereby making it difficult to track and estimate position and time data associated with the private aircraft based on scheduled and estimated takeoff and landing times. Once the consensus score associated with the node 206 exceeds a certain threshold, the node 206 can be considered a trusted node and can be utilized by other validator nodes to determine consensus scores for untrusted nodes in the network in accordance with some embodiments. The consensus score can change dynamically given the current number of trusted and untrusted nodes operating along with the number of validators.

In some embodiments, if the ADS-B or Remote ID data that the node 206 has shared with the validator 228 is determined to be invalid based on a consensus amongst other trusted miner nodes, regulatory data analysis and simulation, and/or other consensus mechanisms, the consensus score of the node 206 can be decreased. The decrease in the consensus score is a penalty. The node 206 can be penalized and the corresponding consensus score associated with the node 260 can decrease if there are direct trusted nodes refuting the validity of the ADS-B or Remote ID data. This can be the most severe penalty. The amount by which the consensus score can decrease can be directly related to the amount of invalid data shared, as it results from spoofing or erroneous hardware.

The node 206 can be penalized and the corresponding consensus score associated with the node 260 can decrease if the regulatory data does not match the expected value from the node 206. This penalty can be considered to be intermediate as it indicates invalidity. If there are no trusted nodes within proximity of node 206 that can be relied on to provide ADS-B or Remote ID data that can be used to compare against the ADS-B or Remote ID data received by node 206, however the regulatory data matches with the ADS-B or Remote ID data received by node 206, this will have the least penalty on the consensus score for node 206.

In some embodiments, if node 206 has a consensus score that is above a predetermined threshold, and it is the only node receiving ADS-B or Remote ID data from an aircraft or drone, the ADS-B or Remote ID data will not be published to the blockchain until it can be verified or verified. In this scenario, another trusted node that has the ability to triangulate a transportation vehicle (airplane or drone) that is producing ADS-B or Remote ID data coinciding with a similar trajectory to that of the aircraft or drone that the node 206 is tracking. In some embodiments, the ADS-B or Remote ID data that the node 206 has received can be validated by one or more trusted nodes or validator nodes based at least in part on simulation of regulatory data to determine if the ADS-B or Remote ID data that node 206 has received actually matches the possibilities of regulatory data.

In some embodiments, if the ADS-B or Remote ID data is not validated, it will not yet be published to the public ledger or blockchain, but can be added at a later time after validation. The ADS-B or Remote ID data produced by untrusted mining devices will only be published to the public ledger or blockchain if it can be validated using peer consensus, regulatory data simulation, or mining devices that are within a geographic proximity of the mining device generating the ADS-B or Remote ID data. This provides un-trusted mining device with the opportunity to have the ADS-B or Remote ID data that it has received published to the public ledger or the blockchain by a validator node, while being compensated until the consensus score of the un-trusted mining device exceeds the predetermined threshold, and keeping the validity of the public ledger of the blockchain protected from spoofed ADS-B or Remote ID data or errors in ADS-B or Remote ID data. Mining devices that have a consensus score that exceeds the predetermined threshold can be designated a validator node that an participate in a random peer consensus election process in some embodiments.

If the ADS-B or Remote ID data that received by the node 206 is determined by the validator node 228 to be valid, the validator node 228 will take the HE Data (x) 222 and apply a final HE validation signature operation $f_1(\ )$ 230 to the HE Data (x) 222 thereby producing $f_1$(HE Data (x) 222), indicating that the HE Data (x) 222 is valid, before publishing the signed HE Data (x) 222 to the public ledger or blockchain 224. If the ADS-B or Remote ID data that received by the node 206 is determined by the validator node 228 to be invalid, the validator node 228 will take the HE Data (x) 222 and apply a final HE validation signature operation $f_2(\ )$ 230 to the HE Data (x) 222 thereby producing $f_2$(HE Data (x) 222), indicating that the HE Data (x) 222 is invalid, before publishing the signed HE Data (x) 222 to the public ledger or blockchain 224.

In some embodiments, the ledger or blockchain can be stored across the network of mining devices in a decentralized manner. That is to say, that pieces of data recorded in the ledger, or blocks of the blockchain, are stored on different devices forming the decentralized network of mining devices. The mining devices have access to the ledger or blockchain and therefore data recorded in the ledger or the blockchain can be bought and sold by users operating the mining devices in the decentralized network. In some embodiments, one or more of the mining devices can be configured to create tokens that can be bought, sold, or traded. The tokens can be non-fungible tokens (NFTs) each of which is unique and can correspond to unique data recorded in the ledger or blockchain. As mentioned above, the consensus score of a mining device can be based on the uniqueness of the ADS-B or Remote ID data that a mining device receives. As an example, node 206 might receive ADS-B or Remote ID data from an aircraft carrying foreign dignitaries. The ADS-B or Remote ID data associated with the aircraft carrying the foreign dignitaries is unique, because the people on the aircraft are foreign dignitaries and it likely is not a commercial airliner. As a result, the owners or operators of the mining device making up the decentralized network may have their mining devices configured to determine the ADS-B or Remote ID data that coincides with important people, such as foreign dignitaries, and can generate a NFT associated with ADS-B or Remote ID data received from the aircraft carrying the people on the aircraft. The mining devices can determine whether the ADS-B or Remote ID data produced by the aircraft coincides with foreign dignitaries from a certain country by analyzing media outlet data or social media platforms to determine when foreign dignitaries are scheduled to fly from one place on the globe to another, and purchasing data associated with a flight path or trajectory that the aircraft has taken between the point of origin and its destination. If the point of origin and point of destination, or the traveled flight path, coincides with the information obtained from media outlets or social media about the foreign dignitaries travels, then the mining devices can determine that the ADS-B or Remote ID data that was broadcast by the aircraft, and recorded to the ledger or the blockchain, coincides with the travel plans of the foreign dignitaries and can generate a NFT associated with the ADS-B or Remote ID data recorded to the ledger or blockchain. The data recorded in the ledger or blockchain can be referred to as a data marketplace 214. Because the node 206 received the real-time un-encrypted ADS-B or Remote ID data 208, and the real-time un-encrypted ADS-B or Remote ID data 208 is recorded to the ledger or blockchain, node 206 can verify that it was the node that received the data because it was encrypted with its private key 212. As a result the node 206 can decrypt the real-time un-encrypted ADS-B or Remote ID data 208 recorded to the ledger or blockchain, using private key 212, to verify that it was the node that received the real-time un-encrypted ADS-B or Remote ID data 208.

In some embodiments, some mining devices can be trusted custodians (TCs) of the ledger or the blockchain. TCs are trusted mining devices that have mined and or staked a predetermined level of related cryptocurrency, fiat currency, or minted NFTs, asset coins, asset tokens, in the ledger or blockchain. TCs can selectively mint NFTs from ADS-B, Remote ID, or AIS data stored on the related ledger or blockchain. In some embodiments, TCs can also use their access to real time data being validated to generate virtual geo-avatars in virtual environments such as virtual reality, augmented reality, video games, gambling, etc. Contributing Users who have tracked transportation vehicles will have a private key for each asset tracked and when data associated with that transportation vehicle is exchanged for value on the blockchain through purchasing, minting, auctioning, forging, fees, etc. the "contributing users" who have the associated private key will be compensated with a relative amount of cryptocurrency through the marketplace, following the "rules and regulations" programmed into the mining smart contract such as future commissions on minted NFTs, percentage share per asset for proof of stake holders, etc.

Contributing users can be any nodes or mining devices involved in the tracking of a transportation vehicle from a point of origin to a point of destination. Each contributing user can have their own private key associated with their portion of data from the aggregate of flight data. The contributing users can opt in to benefit from the marketplace using their private key. If opted in, when an NFT is minted by a TC on the blockchain the contributing user's private key will be exchanged. The contributing user's private key associated with the related flight data will be transferred to the TC for them to retain digital asset ownership of all the flight data as their own, by paying a relative amount of token or currency to the private key holders. If opted out, when an NFT is minted by a TC, the digital ownership will just not include the private key info or flight data from that user's miner.

In some embodiments, Contributing Users will also receive compensation when their public encrypted data is used by third party cloud services providers and HE based data processing platforms for analyzing global ledger or blockchain transportation vehicle data in real time or historically without compromising the data unique values. There will be a higher compensation for sharing the public key and further compensation for sharing the private key, which public users can use to decrypt the f(x) data on the public blockchain for further analysis.

In some embodiments, the ADS-B, Remote ID, or AIS data of transportation vehicles tracked using proof of reception methods and their associated blockchain signatures, data, fingerprint, etc. can be transacted for cryptocurrency or fiat currency. Real time ADS-B, Remote ID, or AIS data can be selected for purchase by TCs who have staked a related amount of crypto or fiat currency or equivalent value in NFT, etc.

In some embodiments, data can be bought as historical blocks or through a "gas fee", which increases the market value of all compensation, newly generated "asset coins" of which there are a limited supply, for the transportation vehicles that are tracked, monetarily corresponding to their "uniqueness value" to access real time data from transportation vehicles as blocks are being validated, and the demand of the overall "gas" supply of buyers and sellers.

A gas fee, or a blockchain transaction fee, is fee paid by the mining devices to the validator nodes for their services on the blockchain. At certain times there is a high demand for computation, such as minting NFTs or transferring tokens between wallets, and the gas fee dynamically adjusts to be higher. This increase is due to validators on the network demanding a higher price for mining or computing on the network leading to increased gas fees for the whole network. The gas fee of the data marketplace 214 can be determined by the amount of wallets which are minting, buying, selling NFTs, or buying HE data, and the magnitude of the price for which they are being minted or transacted for.

In some embodiments, historical data associated with tracking of a transportation vehicle over the course of transportation vehicle's path of travel that corresponds to an initial and final block of the blockchain can be purchased with a delay of a period of time after validation and consensus of the block is achieved and is published to the blockchain as HE Signed Data f(x) 222. Public homomorphically encrypted data and the associated private keys of mining devices (nodes) that have opted to share their associated private keys in addition to the private keys of the TCs that have also opted to share their private keys, can be bought through auction, tender, negotiation, etc. in accordance with some embodiments.

Figure 4:
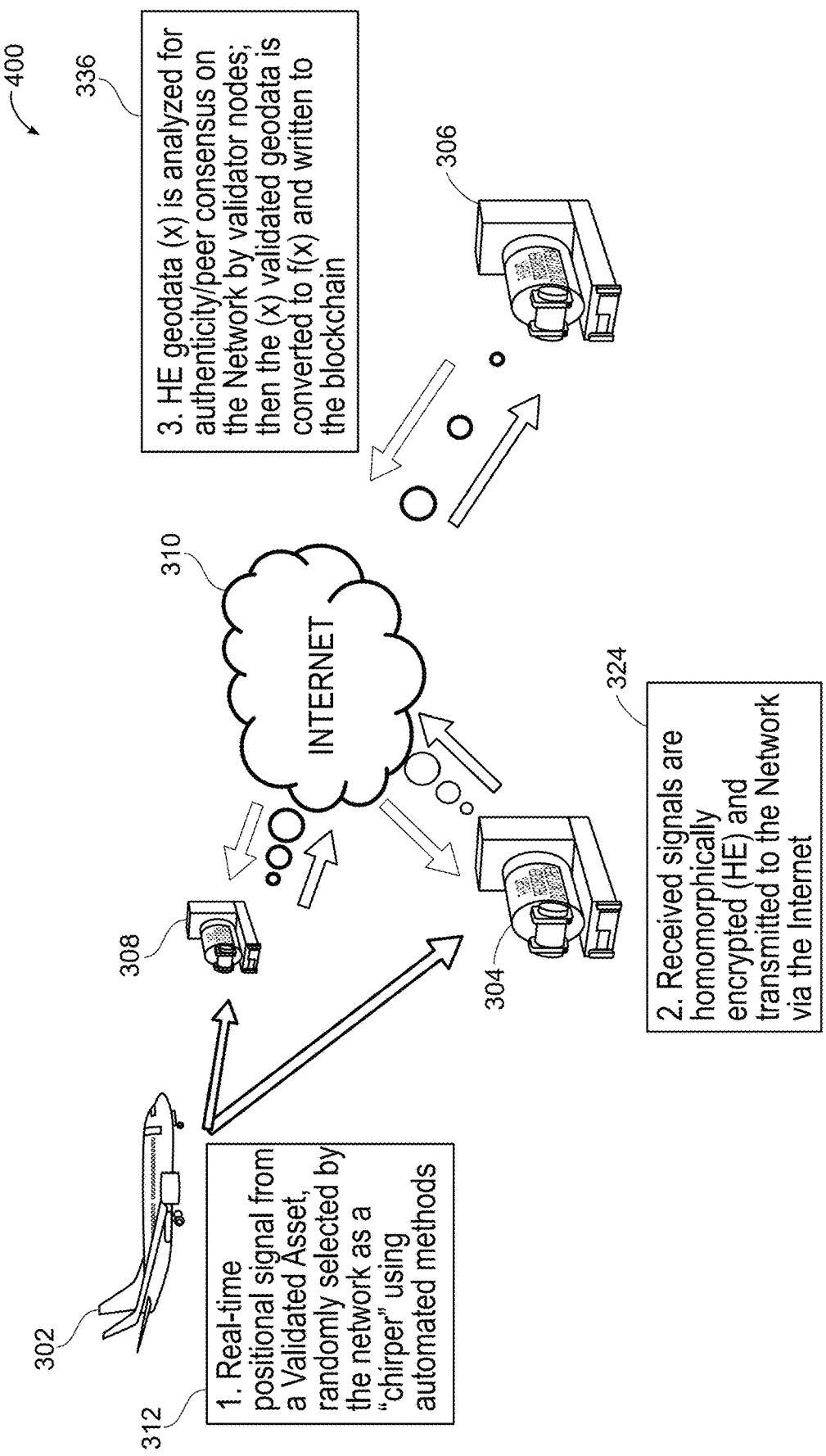
FIG. 4 schematically depicts a network for transmitting and receiving homomorphically encrypted transportation vehicle data, in accordance with some embodiments of the disclosure.

FIG. 4 illustrates an exemplary network 400 for transmitting and receiving homomorphically encrypted transportation vehicle data that is generated by an airplane 302, received by a mining devices 304 and 308 and validated by validator 306 in accordance with some embodiments. Real time position data 312 produced by airplane 302 can be broadcast over a certain footprint of the ground over which is flying, and the real time position data 312 can include ADS-B data that is received by a mining device 304. The mining device 304 can apply a homomorphic encryption algorithm to the received real time position data 312 using a unique private key associated with the mining device 304 and transmit the real time position data 312 that has been homomorphically encrypted to the validator 306 via the internet 310. The mining device 308 can also receive the real time position data 312 and can similarly apply a homomorphic encryption algorithm to the received real time position data 312 using a unique private key associated with the mining device 308 and transmit the real time position data 312 that has been homomorphically encrypted to the validator 306 via the internet 310.

The validator 306 can receive the real time position data 312 that has been homomorphically encrypted from the mining devices 304 and 308 and can analyze the homomorphically encrypted real time position data from the mining devices 304 and 308 and compare it to homomorphically encrypted data from other trusted mining devices that are in the same geographic area of the mining devices 304 and 308 to determine whether the homomorphically encrypted real time position data received by the mining devices 304 and 308 is valid. This can be referred to as a peer consensus protocol 336. The validator 306 can publish the homomorphically encrypted real time position data received by the mining devices 304 and 308 to the ledger or blockchain, after the validator 306 applies a validation signature operation to the homomorphically encrypted real time position data received by the mining devices 304 and 308.

Figure 5:
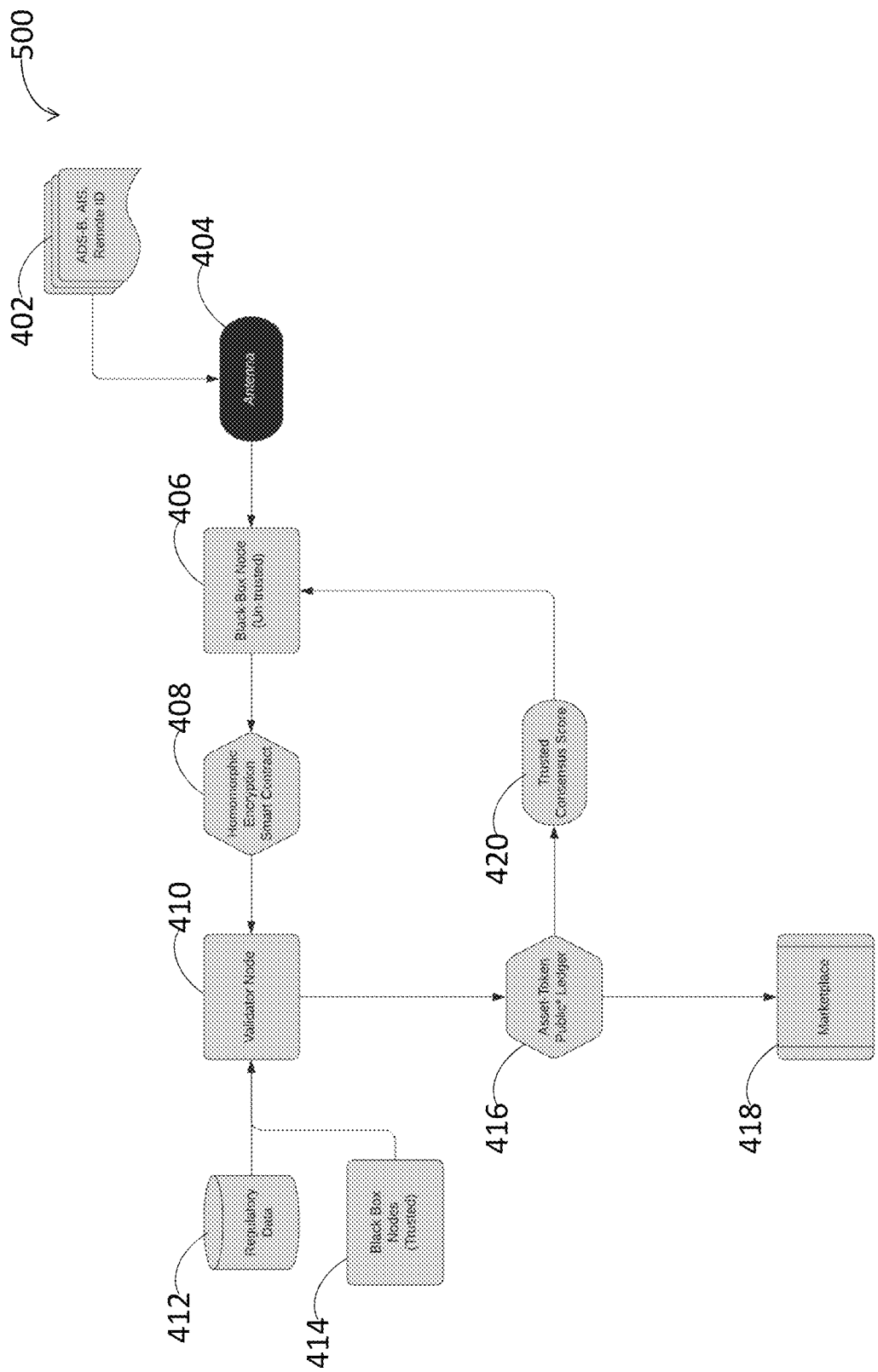
FIG. 5 is a flow diagram illustrating a process of validating homomorphically encrypted transportation vehicle data and generating a consensus score for a mining device, in accordance with some embodiments of the disclosure.

FIG. 5 is a flow diagram illustrating the process of validating homomorphically encrypted transportation vehicle data and generating a consensus score for a mining device, in accordance with some embodiments of the disclosure. The process 500 includes an untrusted mining node (black box node (un-trusted) 406), a validator node 410, and a trusted mining node (black box nodes (trusted) 414). The untrusted mining node, validator node 410, and trusted mining node form a decentralized network. The untrusted mining node may receive transportation vehicle information such as ADS-B, AIS, Remote ID data 402 that is broadcast from an airplane, drone, or ship, boat, or vessel via antenna 404 that is in transit from a point of origin to a point of destination. In some embodiments, the untrusted node can homomorphically encrypt the ADS-B, AIS, Remote ID data 402 into a homomorphically encrypted smart contract 408 and transmit the homomorphically encrypted smart contract 408 to a validator node 410 that will compare the data in the homomorphically encrypted smart contract 408, corresponding to the ADS-B, AIS, or Remote ID data 402, to regulatory data 412 corresponding to the point of origin, point of destination, weather, wave buoy, or flight routing information in order to determine whether the ADS-B, AIS, Remote ID data 402 received by the untrusted mining node is valid. The validator node 410 can also compare data received by the trusted mining node to the data in the homomorphically encrypted smart contract 408, and determine whether the ADS-B, AIS, or Remote ID data 402 received by the untrusted mining node is valid. If the validator node 410 determines that the ADS-B, AIS, or Remote ID data 402 is valid, the validator node can broadcast a trusted consensus score 420 associated with the trusted mining device to the untrusted mining node. The validator node 410 can then apply a validation signature operation to the homomorphically encrypted smart contract 408, and publish a signed version of the homomorphically encrypted smart contract 408 to the public ledger 416. The data recorded in the public ledger 416 can be referred to as a marketplace 418 in accordance with some embodiments.

Figure 6:
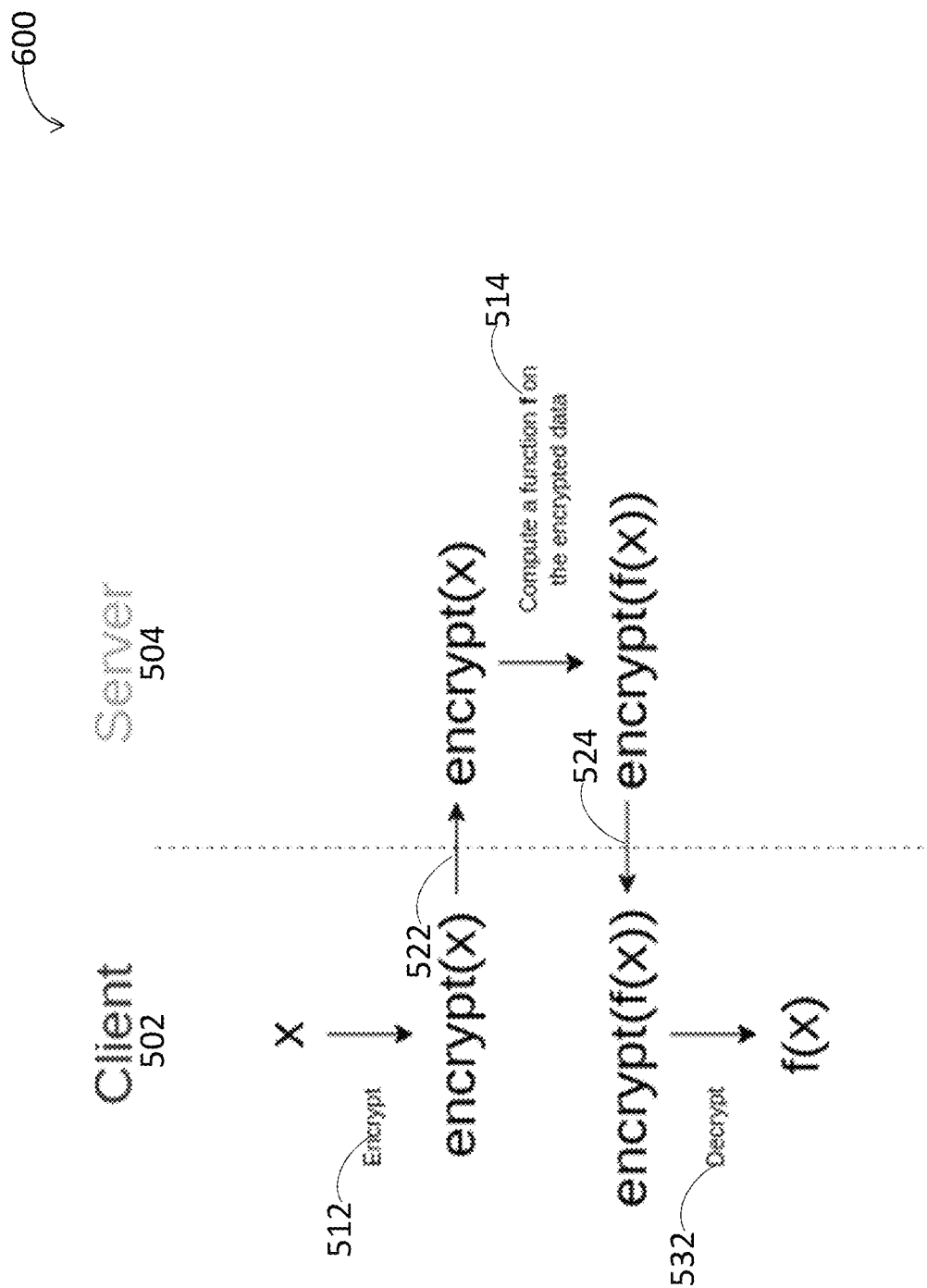
FIG. 6 is a flow diagram illustrating a process of applying an operation to homomorphically encrypted transportation vehicle data, in accordance with some embodiments of the disclosure.

FIG. 6 is a flow diagram illustrating a process 600 of applying an operation to homomorphically encrypted transportation vehicle data, in accordance with some exemplary embodiments of the disclosure. The client 502 can be a mining device that homomorphically encrypts data (x) associated with a transportation vehicle that is in transit into encrypt(x) 512. The data (x) can be data associated with a transportation device that should remain private. For instance, the data (x) can be ADS-B, AIS, or Remote ID data as mentioned above, that is received by the client 502. The client 502 transmits encrypt(x) 512 to the server 504 which is a validator node similar to a validator node 410 in FIG. 4 or validator node 608 in FIG. 6 that is capable of applying a homomorphic signature operation to encrypt(x) 512. The server 504 can apply a homomorphic operation, or compute a homomorphic function f( ) 514 on encrypt(x) 512 such that the resulting value of the application of the function 514 to encrypt(x) 512 is homomorphically similar to encrypting the function f( ) 514 being applied directly to the data (x). That is the application of function f( ) 514 to encrypt(x) 512 is homomorphically similar to encrypt(f(x)) 534. The server 504 can transmit encrypt(f(x)) 534 to client 502, and the client 502 can decrypt encrypt(f(x)) 534 into f(x) 532 because the client 502 used its private key to generate encrypt(x) 512 by encrypting data (x).

Because the client 502 homomorphically encrypts data x (encrypt(x) 512), and the server 504 applies the homomorphic function f( ) 514 to encrypt(x) 512, when the client 502 decrypts encrypt(f(x)) 534 into f(x), the client 502 can view the results of the application of homomorphic function f( ) 514 to the data (x). Furthermore because the client 502 homomorphically encrypts data (x) with its own private key, the server 504 cannot recover the data (x). As a result, this provides the users or operators of the client 502 with the ability to participate in ownership of the data (x) without compromising the privacy of the data (x) while using untrusted machine learning models upon sensitive data (x).

The client 502 can securely transfer sensitive data can to the server 504, which may not be a trusted party, and request the server 504 to process and/or analyze the sensitive data according to a set of parameters provided to the server 504 by the client 502. Because the sensitive data (x) is homomorphically encrypted and the requested processing and/or analysis of the sensitive data involves the application of a homomorphic function to the sensitive data by the server 504, the server 504 will not have access to the sensitive data.

In some embodiments, encrypt(x) 512 can be analyzed by the server 504 using privacy preserving neural network methods and a signed validation operation such as f( ) can be performed. This signed data f(x) 532 does not reveal the intricacies of encrypt(x) 512, but retains enough structure that validator nodes in the decentralized network can analyze the data in the signed data f(x) 532 to verify its authenticity and validity in relation to other data sources. The (x) data will be converted to f(x) by each miner, transmitted to the network, verified by validators, and f( ) is further operated upon to sign the data f(x) as valid or invalid before writing to the blockchain.

In some embodiments, mining devices, other than client 502, can access the signed data f(x) 532 on the blockchain and apply one or more operations to the signed data f(x) 532 such as applying neural network weights to the signed data f(x) 532, thereby transforming the signed data f(x) 532 into another value g(f(x)). The mining devices, other than client 502, can publish g(f(x)) to the blockchain or internet repositories such as Github. However without the private key of the client 502, the mining devices other than client 502, cannot recover g(f(x)) thereby keeping the data (x) private. Only the client 502 can use its private key to decrypt g(f(x), and in combination with the signature of the validator who signed the data by applying the function f( ) to the data (x), the client 502 can recover g(x) which is a weighted version of the data (x) in accordance with some embodiments.

In some embodiments, the client 502 will have a democratic mining algorithm based upon the use of homomorphic encryption and neuromorphic computing techniques. Data such as ADS-B, AIS, or Remote ID data that is received via sensors or antennas communicatively coupled to the client 502, is validated by a neuromorphic processor in the client 502 and can be homomorphically encrypted with a private key unique to the client 502, or a wallet associated with the client device 502 in addition to a public key.

Figure 7:
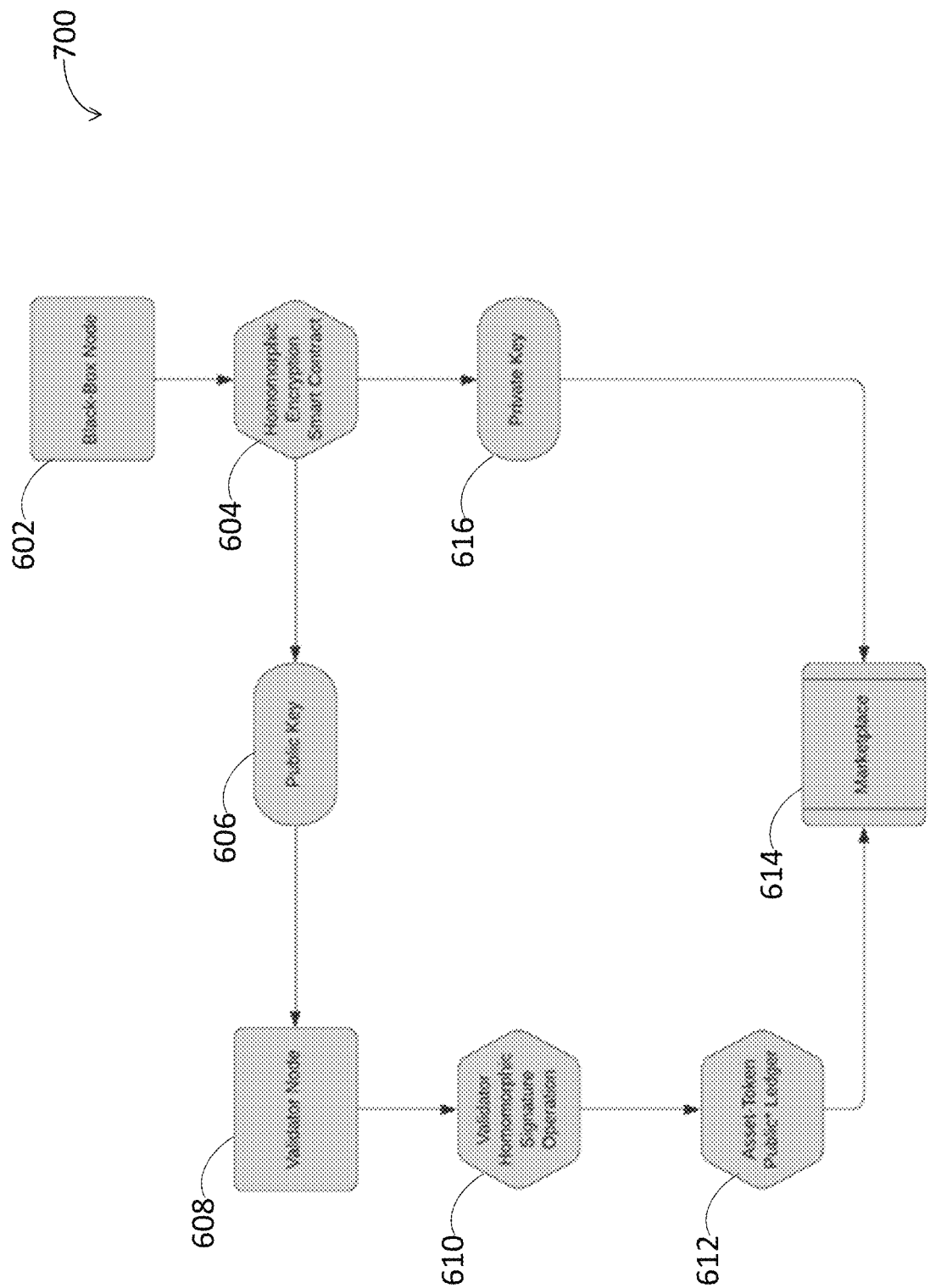
FIG. 7 is a flow diagram illustrating a process of validating homomorphically encrypted transportation vehicle data, in accordance with some embodiments of the disclosure.

FIG. 7 is a flow diagram illustrating a process 700 of validating homomorphically encrypted transportation vehicle data using a homomorphic signature operation, in accordance with some embodiments of the disclosure. Process 700 can include a black box node 602, which can be a trusted mining device or an untrusted mining device, and a validator node 608. The black box node 602 can apply a homomorphic encryption operation to transportation vehicle data such as ADS-B, AIS, or Remote ID data that it receives from a transportation vehicle. The black-box node 602 applies the homomorphic encryption operation to transportation vehicle data using its private key 616. In some embodiments, the black-box node 602 can share the private key 616 with other mining device in a marketplace 614, which includes mining devices of the decentralized network. The black-box node 602 can send, or share, the private key 616 to the marketplace 614 if the black-box node 602 wants to share the transportation data that it received with other mining devices in the marketplace 614. The mining devices in the marketplace 614 can use the private key to decrypt the transportation data that was received by the black-box node 602 and that is recorded in the asset-token public ledger 612. The public key 606 can be shared with the validator node 608 which can be used by the validator node 608 to encrypt messages that it has to send to the black-box node 602. The validator node 608 can also receive the transportation vehicle data from the black-box node 602 and apply a validator homomorphic signature operation 610 to the transportation vehicle data. The validator node 608 can sign the transportation vehicle data, using the validator homomorphic signature operation 610, with a signature that indicates to mining devices that have access to the asset-token public ledger 612 that the transportation vehicle data received from the black-box node 602 is valid. The validator node 608 can sign the transportation vehicle data, using the validator homomorphic signature operation 610, with a signature that indicates to mining devices that have access to the asset-token public ledger 612 that the transportation vehicle data received from the black-box node 602 is invalid. After the validator node 608 signs the transportation vehicle data, homomorphically signed and homomorphically encrypted transportation vehicle data can be published to the asset-token public ledger 612 by the validator node 608.

Figure 8:
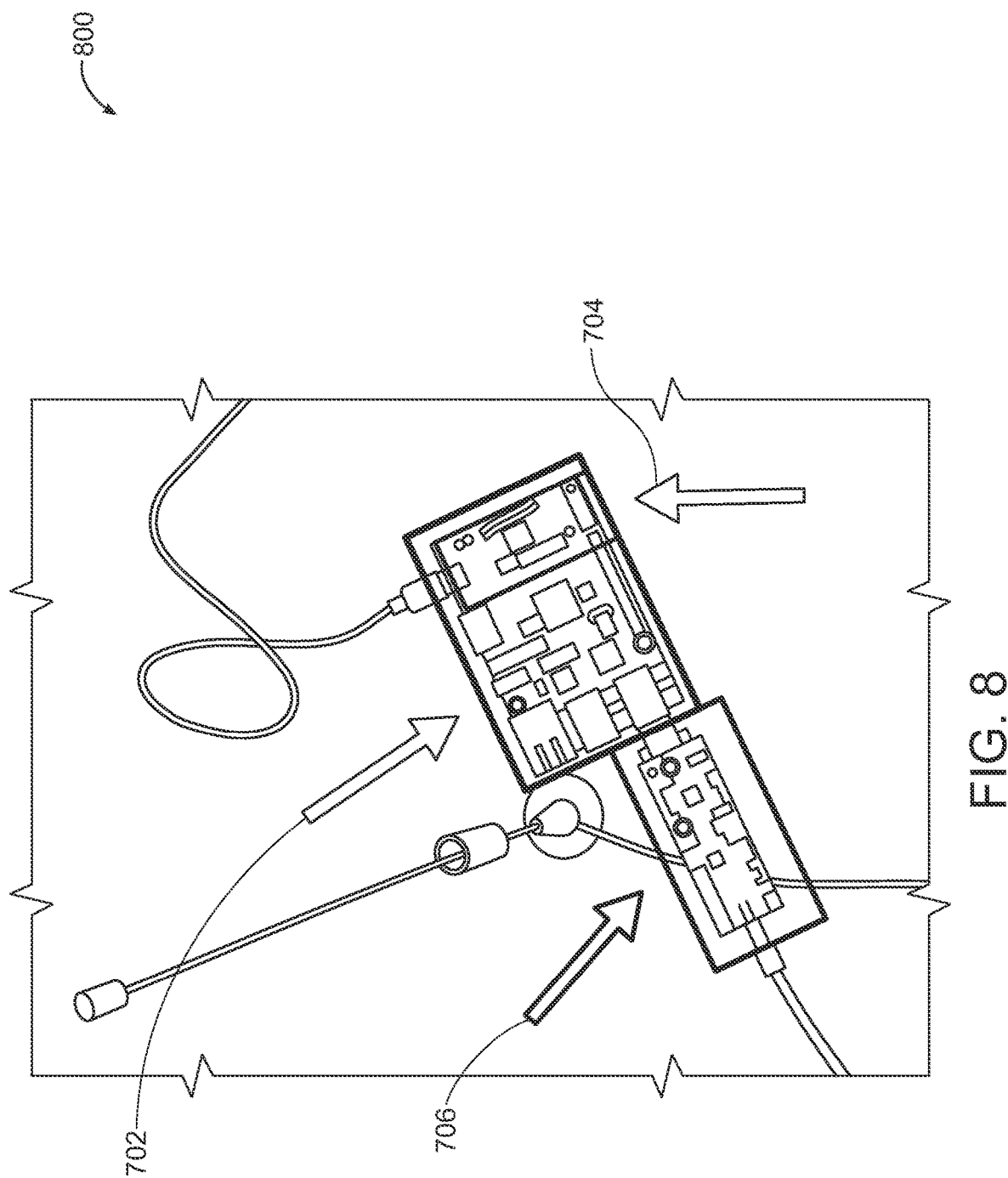
FIG. 8 is an image of a prototype mining device, in accordance with some embodiments of the disclosure.

FIG. 8 is an image of a prototype mining device, in accordance with some embodiments of the disclosure. In some embodiments, the prototype mining device 800 can include a field programmable gate array (FPGA) device that includes a system on chip (SoC) module 702 that emulates a neuromorphic processor, a decoder 706 that is used to decode transportation vehicle data signals, and a secure electronically wired enclosure 704 that prevents physical tampering with mining device 800. In some embodiments the system on chip (SoC) module 702 can be a Trenz Electronics Zynqberry Emulating IBM's TrueNorth Neuromorphic Chip, the decoder 706 can be RTL-USB software defined radio (SDR) Decoder, and the enclosure 704 can be a Zymbit Secure hardware module.

In some embodiments, the SoC module emulating the neuromorphic processor can monitor physical tampering to the mining device 800 through JTAG, USB, or PCI. The enclosure 704 can be powered independently by a battery (e.g., a watch battery) that detects physical tampering of the enclosure in response to an embedded wire being severed. Secure physically tamper-resistant hardware can prevent many geographic tampering and spoofing attacks, while enabling only verified legitimate users, or operators, of the mining device 800 to add validated transportation vehicle data to the decentralized and published to the public ledger or blockchain. In some embodiments, if tampering is actively detected, such as modification to any of the components of mining device 800, this can cause the consensus score of the mining device 800 to be adversely affected, and the consensus score of the mining device 800 can be published to the ledger of the blockchain amongst the validation signature, so all mining devices including validator nodes and TCs will be aware of the change to the consensus score of the mining device 800. This causes the validator nodes to adjust their consensus determination dynamically as the mining device 800 becomes less trusted due to hardware modification or software hacking. If tampering detection is severe enough, the mining device 800 can have its consensus score reset to zero or permanently terminated from adding or publishing data to the ledger or blockchain. Furthermore a penalty multiplier can also be added to the consensus score of the mining device 800 to amplify and prevent any future spoofing. Any gross hardware modifications can be detected by an electrical fault created by cutting of embedded circuitry in the enclosure 704.

Any removal of the real-time clock management, must be performed while the mining device 800 remains powered on, otherwise physical or software tampering is possible, and will result in resetting of the consensus score for the mining device 800 to zero, with a permanently severe penalty multiplier following consensus mechanisms such as Proof of Authority, Proof of Trust, Proof of Rec, Proof of Stake, Blockchain reputation based consensus (BRBC), etc. In some embodiments, the enclosure 704 can include antitampering passive mechanisms such as screws, shearing construction, adhesives, etc. in addition to active mechanisms such as electrical circuitry that is broken when the device is opened without deactivating the active detection mechanisms. In some embodiments, the neuromorphic processor of the device can detect active tampering or side channel attacks of the physical circuitry, components, etc. In addition to detection of digital tampering such as attacks on the ports JTAG, USB, Ethernet, on the mining device 800, the neuromorphic processor can also analyze incoming sensor data from the decoder 706 via a wireless or wired connection of an antenna for example to determine if spoofing or errors are present to prevent erroneous data from being transmitted to the decentralized network for validation by a validator node.

Figure 9:
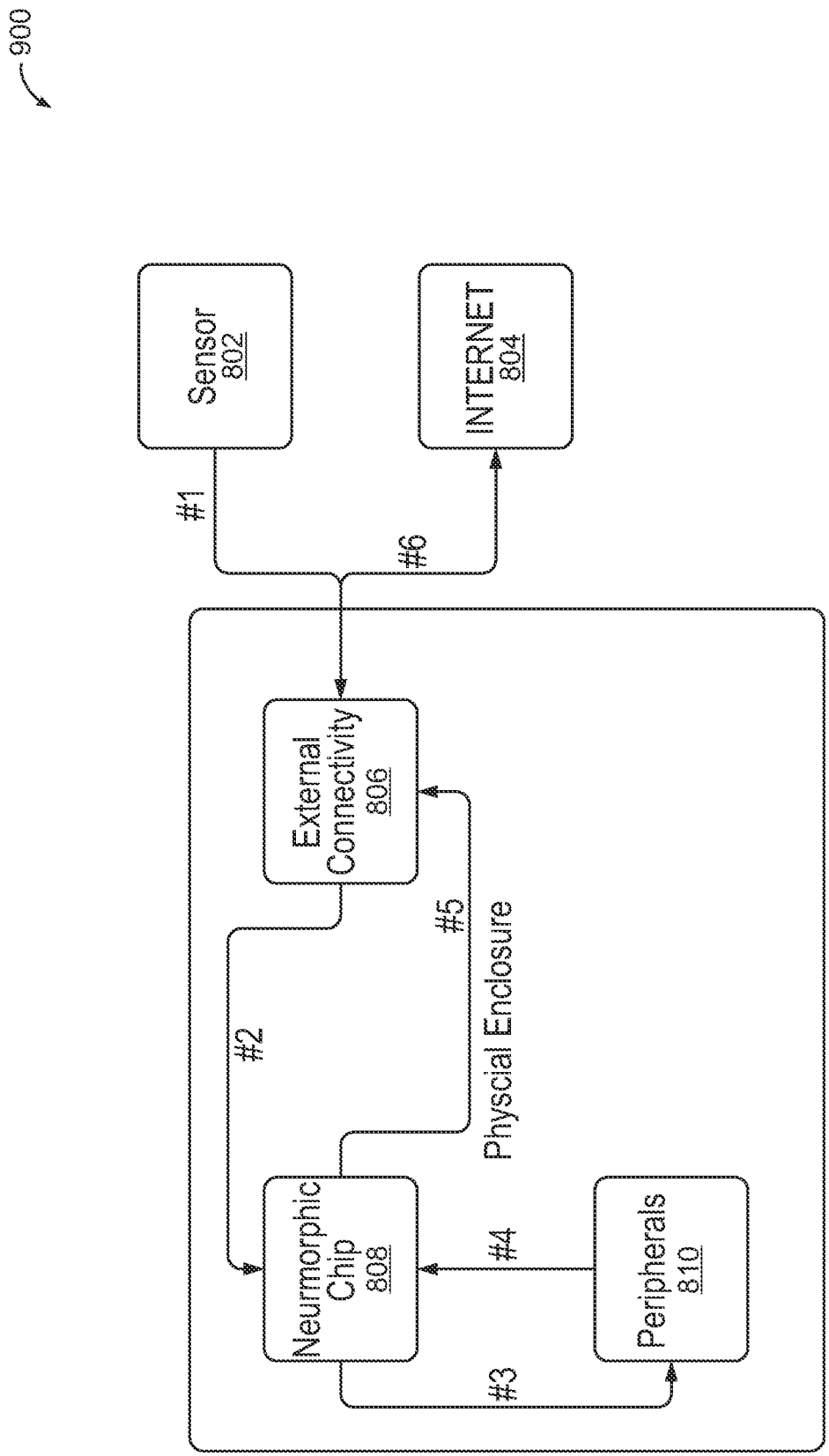
FIG. 9 is a flow diagram illustrating a process of receiving unencrypted transportation vehicle data from a sensor at a mining device and transmitting homomorphically encrypted transportation vehicle data to validator nodes in a consensus network, in accordance with some embodiments of the disclosure.

As shown in FIG. 9, in some embodiments mining device 900 includes a neuromorphic chip 808 (neuromorphic processor), and a physical enclosure 812 between the neuromorphic chip 808 and the external connectivity 806 that is communicatively coupled to the sensor 802 and the Internet 804 through one or more wireless or wired connections. The mining device 900 also includes one or more peripherals 810 that can be TCP/IP, HDMI, PCB connections from the neuromorphic processor to buttons, LEDs, monitor, Bluetooth, etc. The peripherals provide additional functionality to the mining device. The neuromorphic processor is still checking the validity of the incoming and outgoing peripherals signals to the mining device to prevent tampering or spoofing. Transportation vehicle data can be detected by the sensor 802, and can be transmitted by the sensor 802, to the external connectivity 806, which is external to physical enclosure 812, via wireless connection (e.g., IEEE 802.11 or Cellular) or a Wired connection (e.g., Ethernet). In some embodiments, the received transportation vehicle data is sent to the neuromorphic chip 808 from the external connectivity 806, and the neuromorphic chip 808 can verify whether the received transportation vehicle data has been tampered with after being detected by the sensor 802. The neuromorphic chip 808 analyzes the received transportation vehicle data before it transfers the received transportation vehicle data to the one or more peripherals 810 for further analysis and processing in some embodiments. The neuromorphic chip analyzes the incoming sensor data to check if values are within thresholds set by the mining device's firmware, established during manufacturing or through firmware updates. The data packets, electrical signal characteristics, and antenna values will be analyzed to be within thresholds set to prevent spoofing and tampering attacks. ADS-B data for example should be 120 bits with a 8 bit preamble and 112 bits of information about an aircraft. Information about the aircraft should further be within thresholds set by the physical limitations of aircraft types. These can include altitude and speed which can be used for thresholding the validity of data, for example a Cessna 172 should not be broadcasting from 100,000 feet in altitude and therefore, the neuromorphic processor would flag this input before appending to the blockchain network. Additionally, a vehicle at a specific latitude and longitude with altitude, should not be able to move to another latitude, longitude, altitude combination that does not fit within the constraints of the aircraft type's speed or range. These thresholds can be implemented into the neuromorphic processor as a precheck before further processing incoming signal data. Validator nodes of the network would then use multiple receiver's data to determine if the Cessna 172 broadcasting at 100,000 feet was a consensus of multiple receivers or an erroneous decoding from an independent receiver.

The one or more peripherals 810 can transfer the analyzed and processed data back to the neuromorphic chip 808 for final validation and homomorphic encryption. The neuromorphic chip 808 can homomorphically encrypt the analyzed and processed data, and then send the homomorphically encrypted analyzed and processed data to the external connectivity 806 while simultaneously detecting whether the homomorphically encrypted analyzed and processed data is being tampered with as it is being transferred to the external connectivity 806. The homomorphically encrypted analyzed and processed data is transmitted by the external connectivity 806 to the internet 804 via a wireless or wired connection.

Figure 10:
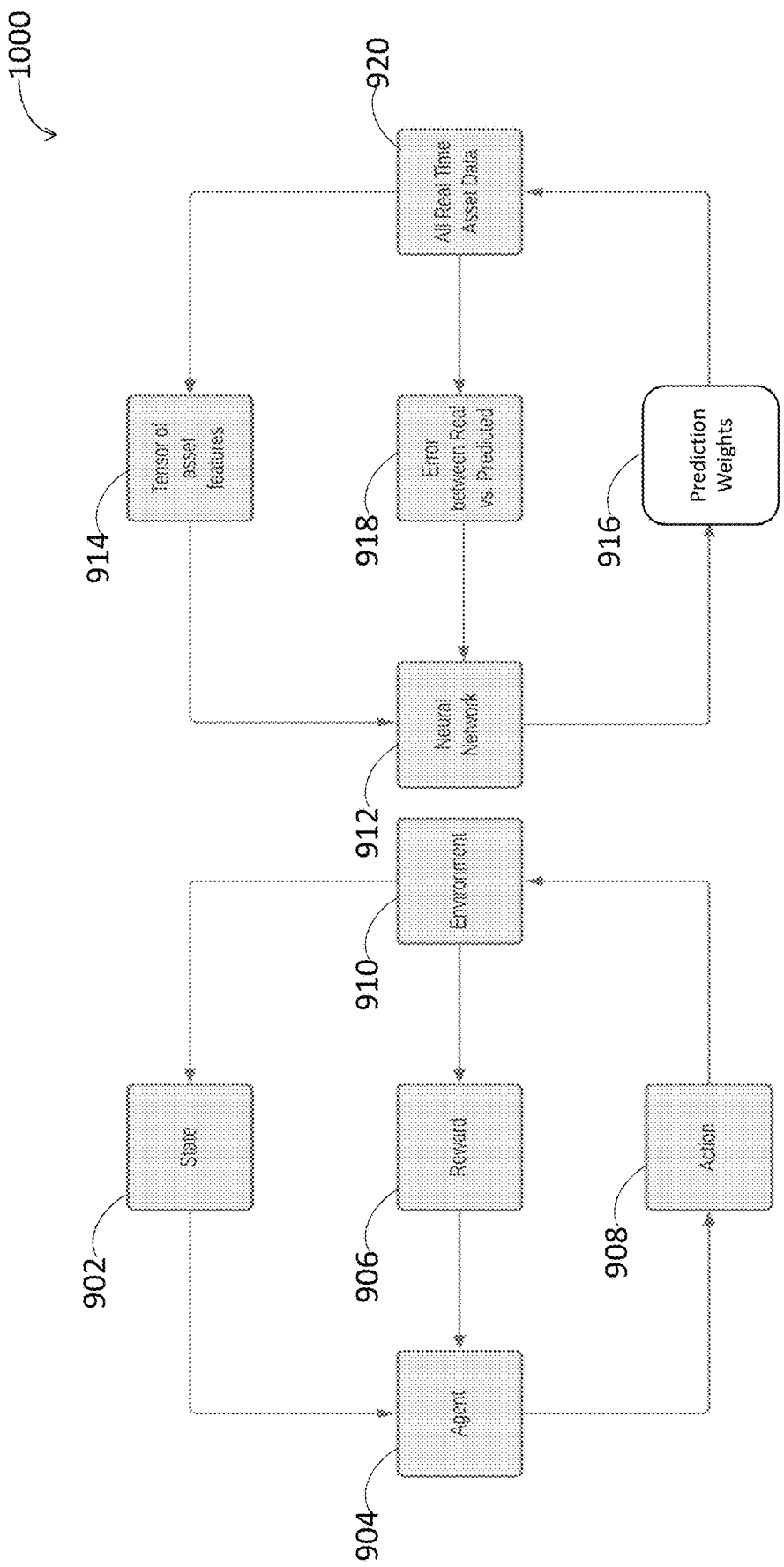
FIG. 10A is a flow diagram illustrating a deep leaning reinforcement process for analyzing real-time transportation vehicle data to predict trajectory of a transportation vehicle, in accordance with the some embodiments of the disclosure.
FIG. 10B is a flow diagram illustrating a process of training a neural network to analyze real-time transportation vehicle data to predict trajectory of the transportation vehicle, in accordance with the some embodiments of the disclosure.

FIG. 10A is a flow diagram illustrating a deep leaning reinforcement process 1000 for analyzing real-time transportation vehicle data to predict trajectory of the transportation vehicle, in accordance with the some embodiments of the disclosure. The neuromorphic processors disclosed herein can execute one or more deep reinforcement learning techniques to analyze all the available transportation vehicle data, such as aircraft, drones, marine vessels, etc. and assign a unique fingerprint to the transportation vehicle data associated the particular transportation vehicle (aircraft, drones, marine vessels). The neuromorphic processor can implement the one or more deep reinforcement learning techniques as an agent 904 that performs certain actions 908 in a given environment, which includes the physical space of real-time and historical transportation vehicle data that has been processed by the neuromorphic processor. The real-time and historical transportation vehicle data can include ADS-B, AIS, or Remote ID data.

Actions such can be performed at a certain state in a certain environment or time. An action at certain time can change the environment and the state to create a new action opportunity at a later time. If the action created a reward from the environment for the agent, then the agent will try to replicate actions similar, while it will do the opposite for actions that do not result in a reward.

For prediction of tracking of aircraft, the agent's state can be the current positional information from available aircraft, or environment. Actions by the agent can be calculating a prediction of the next speed, altitude, heading. These agent's predicted calculation actions will have an error from the next broadcasted real world positional values of an aircraft. These real world values can be used to update the next state of the agent's environment and determine if the agent's prediction was accurate to within an error threshold. If the error is reduced than the agent is rewarded, while if the error is large, the agent is not rewarded to motivate it to make more accurate action predictions.

In the case of an aircraft, even if the real time data is limited or blocked, the agent 904 can seek a solution for obfuscated aircraft data through one or more actions 908 to search the feature space to determine the associated missing registration information given the available data. The available data can be data stored in the 1018 Central Database, such as FAA repositories. In addition, publicly available photos and videos of aircraft which contain aircraft registration numbers and associated geodata. The missing registration information can also be determined based on uncertainty weights. The uncertainty weights can be the error of the agent's action, such as predicting next position or an obfuscated aircraft's actual associated registration, vs. the updated available real world data fed into the environment.

The agent 904 can operate in an environment 910 which can be all the current aircraft data in the central database 1018 and other airplane data. The state can be all of the positional information associated with the environment at different times.

This is where the agent 904 can make a decision or take an action 908 and the environment 910 will respond with the consequence of that action 908, such as the given transportation vehicle data and one or more associated actions 908 not correlating and resulting in an impossible match. Thereby reinforcing the agent 904 to make more accurate decisions and predictions, until fully trained upon a given feature space. For the example of aircraft, and other vehicles, they are unable to be in two locations simultaneously, and therefore the history of an aircraft can be traced from its first flight into FAA airspace and to any airport in the globe that has ADS-B coverage, without the need for any data collection between the two destinations. For each aircraft with adequate history and training, a related reinforcement agent based model can be developed upon the operational signature of the aircraft. This can be used to predict future actions and derive meaning from prior historical data for further analysis.

If the one or more actions 908 taken by the agent 904 are correct, the environment 910 can issue a reward 906 to the agent 904 to reinforce similar actions by the agent 904 in the future. The state can be all of the positional information associated with the environment at different times. In addition to the current data in the central database.

FIG. 9B is a flow diagram illustrating a process 1000 of training a neural network to analyze real-time transportation vehicle data to predict trajectory of A transportation vehicle, in accordance with the some embodiments of the disclosure. The tensor of asset features 914 can be a n-dimensional array of the asset data 920 where n is the number of data points tracked in real time. This tensor could be a 3D tensor with an explicit time axis associated with the positional data.

The multi-dimensional tensor is fed into the neural network 912. The neural network can be trained using data from historical asset data to have prediction weights 916 for calculating a predicted future asset data value, and measuring the error 918.

The neuromorphic processor can implement a neural network 912 that generates one or more predictions weights 916 that are used to predict transportation vehicle position and time data of a transportation vehicle based on all real time asset data 920 and historical transportation vehicle data associated with different transportation vehicles. The neuromorphic processor can compare the all real time asset data 920, which includes position and time data of the different transportation vehicles, to the predicted transportation vehicle position and time data and determine error between the real vs predicted 918 transportation vehicle data. The error between the real vs predicted 918 transportation vehicle data is fed back into the neural network 912 which can adjust the prediction weights 916 to improve future predictions of the position and time data of the different transportation vehicles, by selecting prediction weights 916 that minimize the error between the real vs predicted 918 transportation vehicle data.

Figure 11:
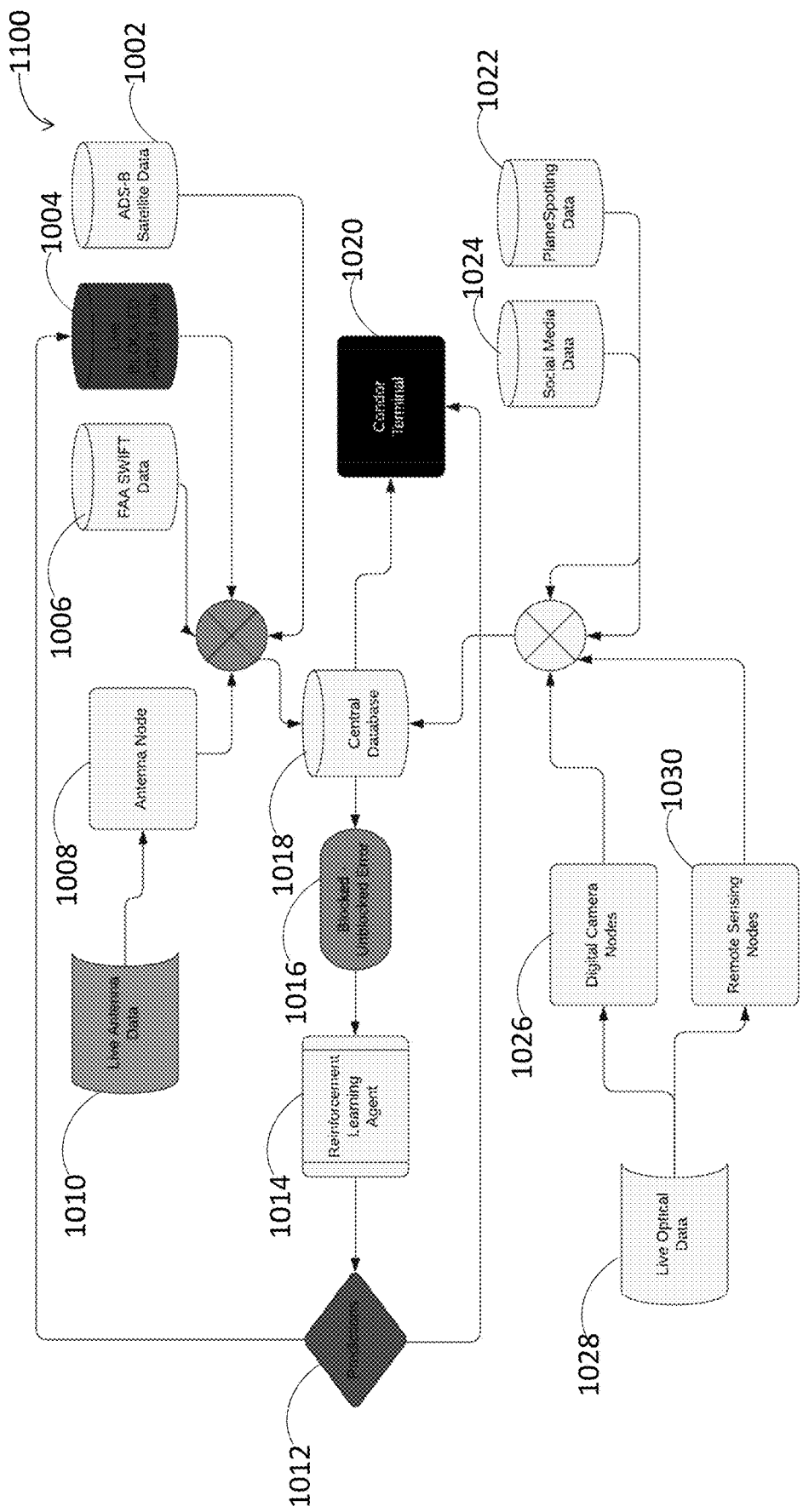
FIG. 11 is a flow diagram illustrating a process for integrating real-time transportation vehicle artificial intelligence data with and publicly available data to generate a fingerprint associated with a transportation vehicle, in accordance with some embodiments of the disclosure.

FIG. 11 is a flow diagram illustrating a process for integrating real-time transportation vehicle artificial intelligence data with and publicly available data to generate a fingerprint associated with a transportation vehicle, in accordance with some embodiments of the disclosure. Process 1100 can include FAA swift data 1006, Live blocked ADS-B data 1004, ADS-B satellite data 1002 each of which can be stored in one or more repositories or databases associated with the decentralized network. The system can further include an antenna node 1008 that receives live antenna data 1010 from transportation vehicles. The live antenna data 1010, FAA swift data 1006, Live blocked ADS-B data 1004, ADS-B satellite data 1002 can all be deposited into central database 1018. An error (blocked—unblocked error 1016) between the Live blocked ADS-B data 1004 and ADS-B satellite data 1002 can be calculated by the reinforcement learning agent. The reinforcement learning agent 1014 can be a randomly selected node's neuromorphic processor or a combination thereof such as fog computing, where a central processor using secure cloud computing resources aggregates the data from all of the randomly selected nodes.

and the blocked—unblocked error 1016 can be used by a reinforcement learning agent 1014 to improve the predictions 1012 associated with position and time data related to the transportation vehicle. The predictions 1012 can be fed back into the Live blocked ADS-B data 1004 and Condor Terminal 1020. Also the live antenna data 1010, FAA swift data 1006, Live blocked ADS-B data 1004, ADS-B satellite data 1002 can also be accessed by the Condor Terminal 1020. Additional data sources such as live optical data 1028, data produced by digital camera nodes 1026, data produced by remote sensing nodes 1030, social media data 1024, and plane spotting data 1022 can also be stored in central database 1018 and accessible by the Condor Terminal 1020.

The live optical data 1028 captured by digital camera nodes 1026 and remote sensing nodes 1030 be analyzed using optical character recognition to determine information associated with the transportation vehicle such as registration information that identifies who owns the transportation vehicle. The live optical data 1028 can include imagery or video of the transportation vehicle. In some embodiments, imagery or video of the transportation vehicle can be obtained from the social media data 1024 or news which may include registration information associated with the transportation vehicle. Once the owner of the transportation vehicle has been determined, a fingerprint can be assigned to the transportation vehicle, and the fingerprint can be utilized to build predictions upon where the aircraft will travel to next with high certainty. After a transportation vehicle has been fingerprinted successfully and this prediction is validated through further analysis of future trips taken by the transportation vehicle, this transportation vehicle can be used to reliably confirm the consensus score of untrusted mining device's transmissions.

Figure 12:
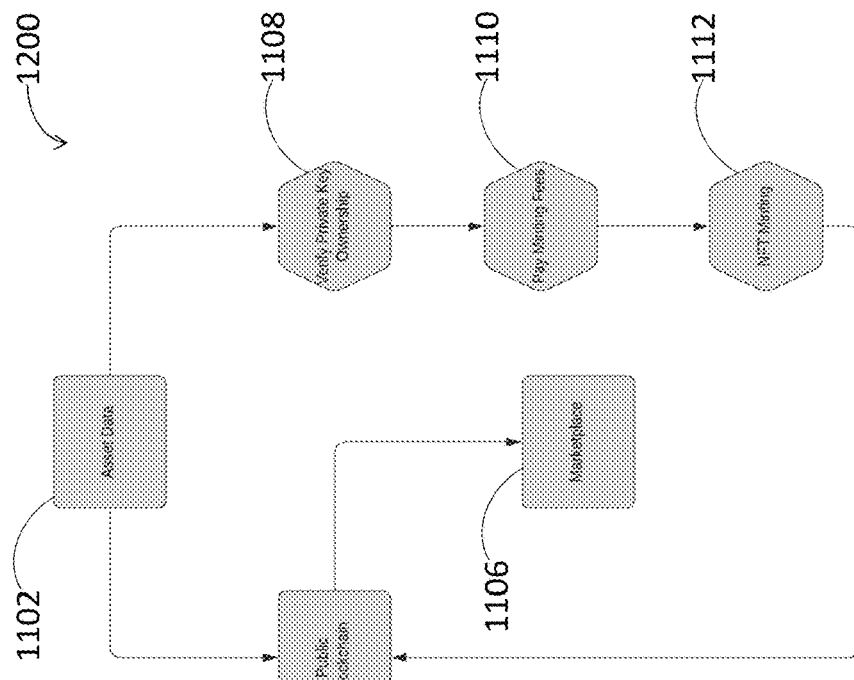
FIG. 12A is a flow diagram illustrating the process of automatically generating an asset token, in accordance with some embodiments of the disclosure.
FIG. 12B is a flow diagram illustrating the process of manually generating an asset token, in accordance with some embodiments of the disclosure.
Figure 12:
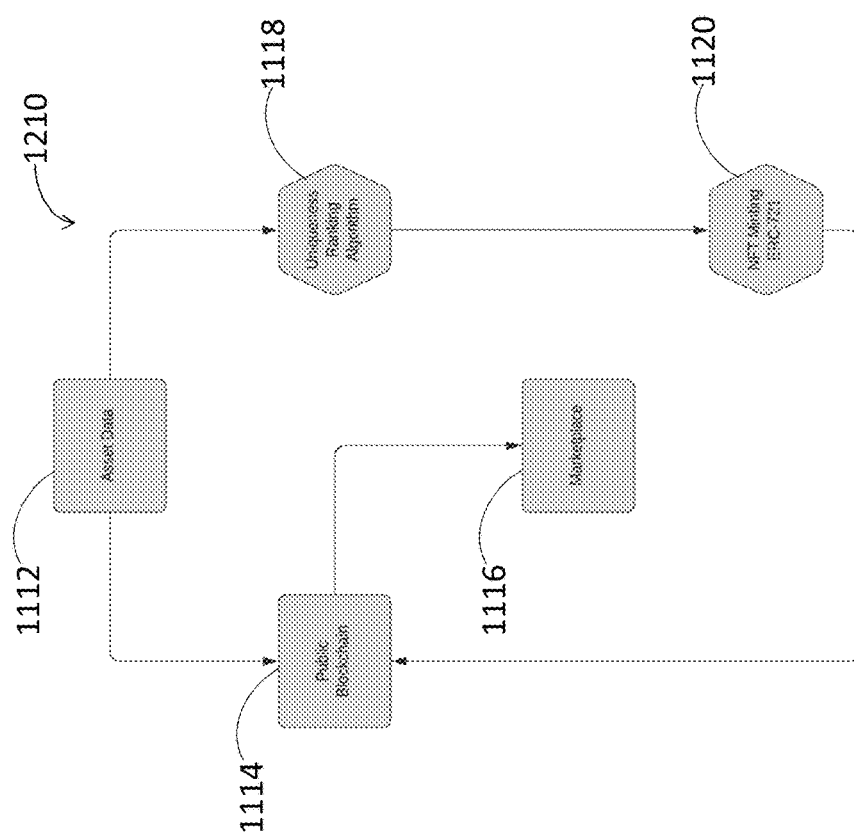

FIG. 12A is a flow diagram illustrating the process 1210 of automatically generating an asset token, and FIG. 12B is flow diagram illustrating the process 1200 of manually generating an asset token. There are many "ordinary" asset movements, such as airplane flights that occur daily, while there are also many unique or special flights such as emergency landings, airport diversions, customized flight plans, etc. There can also be public drone, aircraft, spacecraft flights transmitting geospatial data publicly while traveling throughout the world; in addition to marine vessels, ground based vehicles such as robots, cars, tracked vehicles, etc. Due to the vast amount of flights and other transportation events that occur daily, an automated method for assigning uniqueness and specialty can be used in order to determine which transportation vehicle data (Asset Coins) should be automatically forged into a non-fungible token for public auction (Asset Token).

There can be a limited supply of Asset Coins in order to enable scarcity and prevent inflation of the inherent value which is related to the gas fee and the amount of currency being exchanged for Asset Coins and access to real time blockchain formation or historical data. The amount of Asset Coin distributed can be "halved" over a period of time where the reward is decreased over time, as the price increases. This can be determined automatically, manually, or through miner group voting consensus. Interactions between validated positional data can be used to automatically generate related "Child tokens" from the reaching of a threshold proximal distance or time period in which two or more assets have "interacted" with each other in time, space, or through their own sensor interactions such as Bluetooth, radar, ultrasonic, etc. This can be used to create child tokens from two unique transportation vehicles approaching orthogonal points in time or space at the same or different time such as being on opposite sides or other orthogonal relationships of the earth at the same time, or in the same position but exactly a fixed time period such as 24 hours later. Manually determining which flight data and the resultant flight coins minted should be forged into a non fungible token (NFT) (Asset-Token) is a tedious process and can be automated using artificial intelligence.

A matrix calculation can be performed by the reinforcement learning agent 1014 for assigning a weight towards a given transportation vehicle position and time data that should be selected for forging of a NFT. The weight can be determined by various factors such as for example, flight route frequency, related news media exposure, aircraft owner, flight route unique pattern, etc. The B737 and A320 are the most common aircraft and therefore these are the lowest of rarity, while business jets such as Gulfstream 650 aircraft are more rare in their frequency, increasing their NFT uniqueness weighting. Common routes between destinations for logistics and transportation are commonly repeatedly traveled such as NYC to London, while rare flights such as Beverly, MA to Dubai, UAE are less likely to occur naturally and are therefore more unique. Exposure tools on social media are able to quantify the level of engagement or "impressions" with certain news information or posts, which can be used to quantify in the matrix the public exposure to the flight data such as a passenger disruption causing a flight to divert, events leading to crash or accident, or engagement on social media. The owner of the aircraft and the related flight data has a weighting on the uniqueness matrix, where a high profile public figure on an aircraft is more unique than an aircraft owned by a non-public figure. The effect of geopolitical scenarios such as an airlift from a warzone or notable weather systems can effect flights aggregately. This aggregate effect itself can be minted into a non-fungible token representing the shift or change from prior historical data (e.g. flights being diverted around a country due to geopolitical factors) can be auctioned as a unique NFT. All of these variables will be considered when determining which of the thresholded daily flights should be converted to NFT in real time upon flight completion. Forging of NFTs will be limited to a specific number per day at a fixed price, where trading of the asset can occur, but at each transaction there is a fee incorporated that returns a percentage of the traded asset value towards the mining devices that received the transportation vehicle position and time data.

As shown in FIG. 112 the process 1210 shows how asset data 1112 (transportation vehicle data) can be ranked by a uniqueness ranking algorithm 1118 in comparison to other asset data, and if the asset data 112 is ranked high enough the asset data 1112 can be minted in accordance with NFT minting ERC-721 1120. The minted asset data 1112 can be published to the public ledger or public blockchain 1114 along with the asset data 1112. And the minted asset data 1112 is made available in a marketplace 1116. In FIG. 112 asset data 1102 can be published to the public ledger or public blockchain 1104 and the mining device that received the asset data 1102 can verify its private key by decrypting the homomorphically encrypted asset 1102. If the mining device wants to the owner of the private key using currency from their associated wallet. After the mining fees have been paid, the asset data 1102 can be minted in accordance with NFT minting 1112, and the minted asset data 1102 can be published to the public ledger or public blockchain 1104 along with the asset data 1112. And the minted asset data 1112 is made available in a marketplace 1106.

Figure 13:
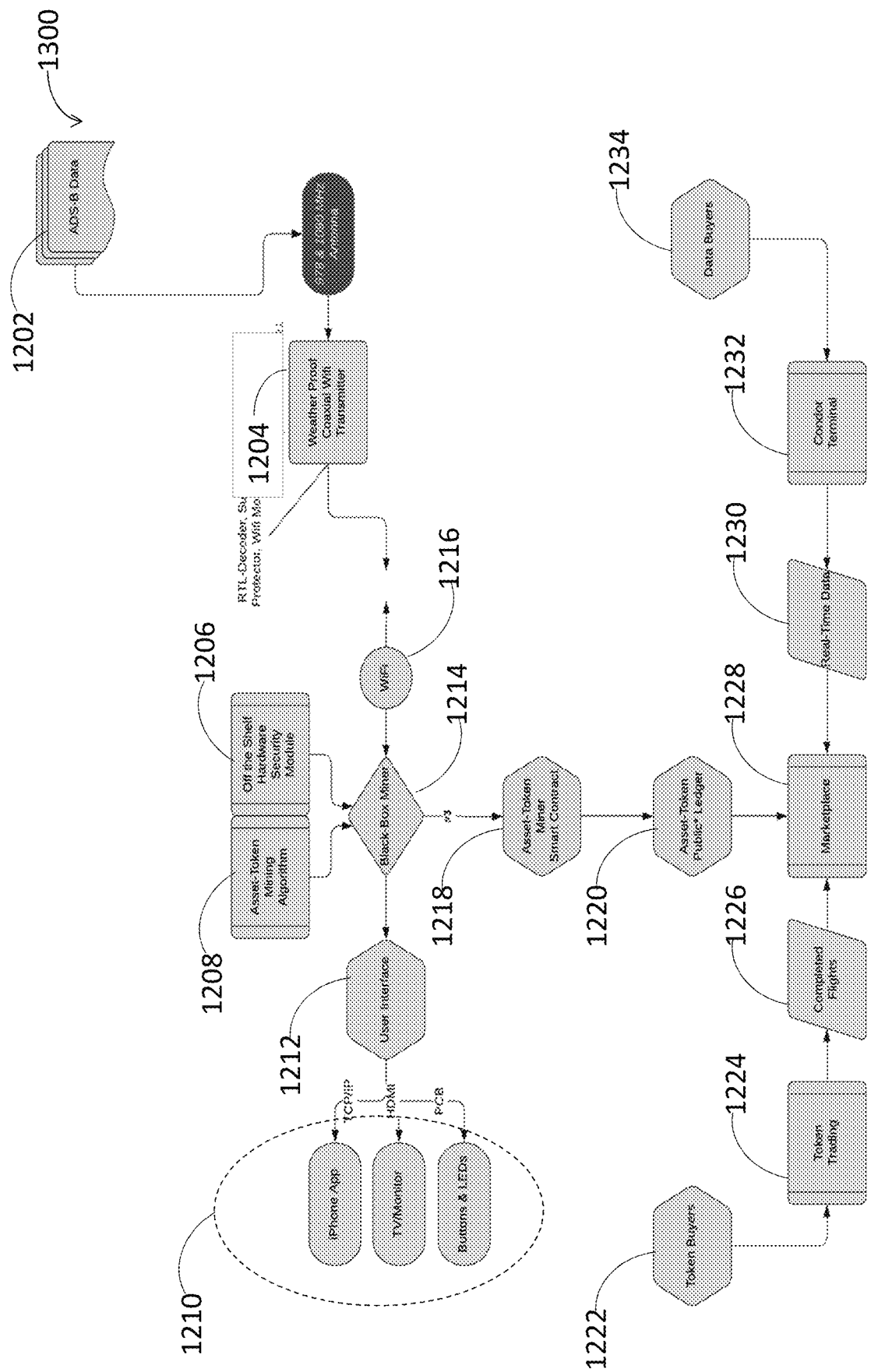
FIG. 13 is a flow diagram illustrating a process of validating homomorphically encrypted transportation vehicle data and publishing the validated homomorphically encrypted transportation vehicle data to a public ledger, in accordance with some embodiments of the disclosure.

FIG. 13 is a flow diagram illustrating the process 1300 of adding a minted token to a market place, in accordance with exemplary embodiments of the disclosure. The process 1300 can begin with the weather proof coaxial wifi transmitter 1204 receiving ADS-B data 1202 on antenna 1236. The ADS-B data 1202 can be transmitted by the weather proof coaxial wifi transmitter 1204 to the Wi-Fi 1216 receiver which is communicatively coupled to the black-box miner 1214. The black-box miner 1214 can include a neuromorphic processor that executes asset-token mining algorithm 1208, and is secured by off the shelf hardware security module 1206. A verified user or owner of the black-box miner 1214 can interact with the black-box miner 1214 user interface 1212 via one or more of the devices 1210 that include a mobile phone application that can be connected to user interface 1212 via an internet connection using TCP/IP, a TV/monitor that can be connected to the user interface 1212 via a HDMI connection, or a Bluetooth and LED device that can be connected to the user interface 1212 via a PCB.

The black-box miner 1214 can homomorphically encrypt the ADS-B data 1202 by applying the asset token mining algorithm 1208 to the ADS-B data 1202 thereby creating an asset-token miner smart contract 1218 which can be published to an asset-token public ledger 1220 after a validator node or trusted black-box miner validates the homomorphically encrypted ADS-B data 1202. The homomorphically encrypted ADS-B data 1202 that is published to the asset-token public ledger 1220 can be published to a marketplace 1228. Token buyers 1222 can be purchasers of non-fungible tokens which have been minted on the marketplace 1228. Previously, marketplace 1106 and 1106 show how NFTs are minted.

Figure 14:
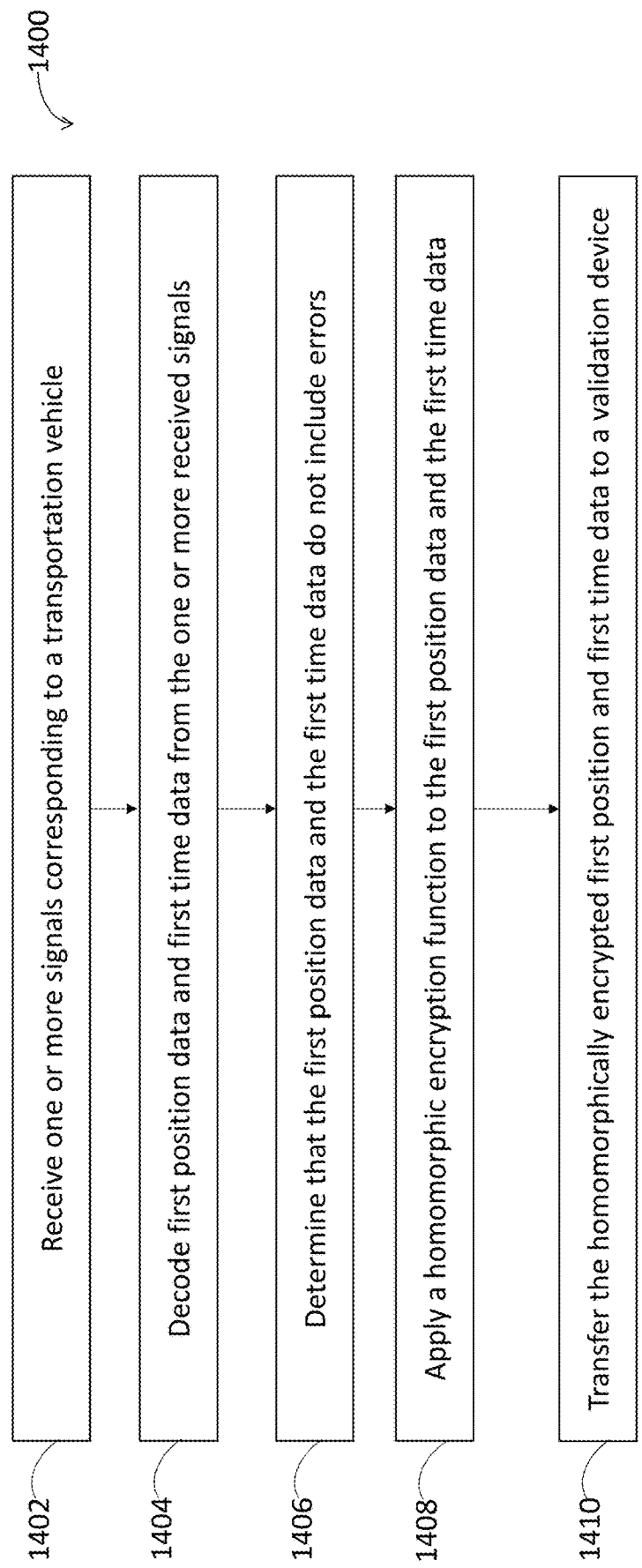
FIG. 14 is a flow chart for processing position and time data at a mining device, in accordance with some embodiments of the disclosure.

FIG. 14 is a flow chart of a process 1400 for processing position and time data at a mining device, in accordance with some embodiments of the disclosure. The process 1400 can begin at block 1402, where a mining device receives one or more signals corresponding to a transportation vehicle. The one or more signals can include ADS-B, AIS, or Remote ID data. The mining device can include a neuromorphic processor that is communicatively coupled to a radio that receives the one or more signals. The mining device can decode the first position data and the first time data from the one or more received signals at block 1404, and then determine that the first position data and first time data do not include errors at block 1406. After determining that there are no errors in the first position data and the first time data, the mining device, and more specifically, the neuromorphic processor can apply a homomorphic encryption function to the first position data and the first time data at block 1408. At block 1410 the mining device can transmit the homomorphically encrypted first position data and first time data to a validation device.

Figure 15:
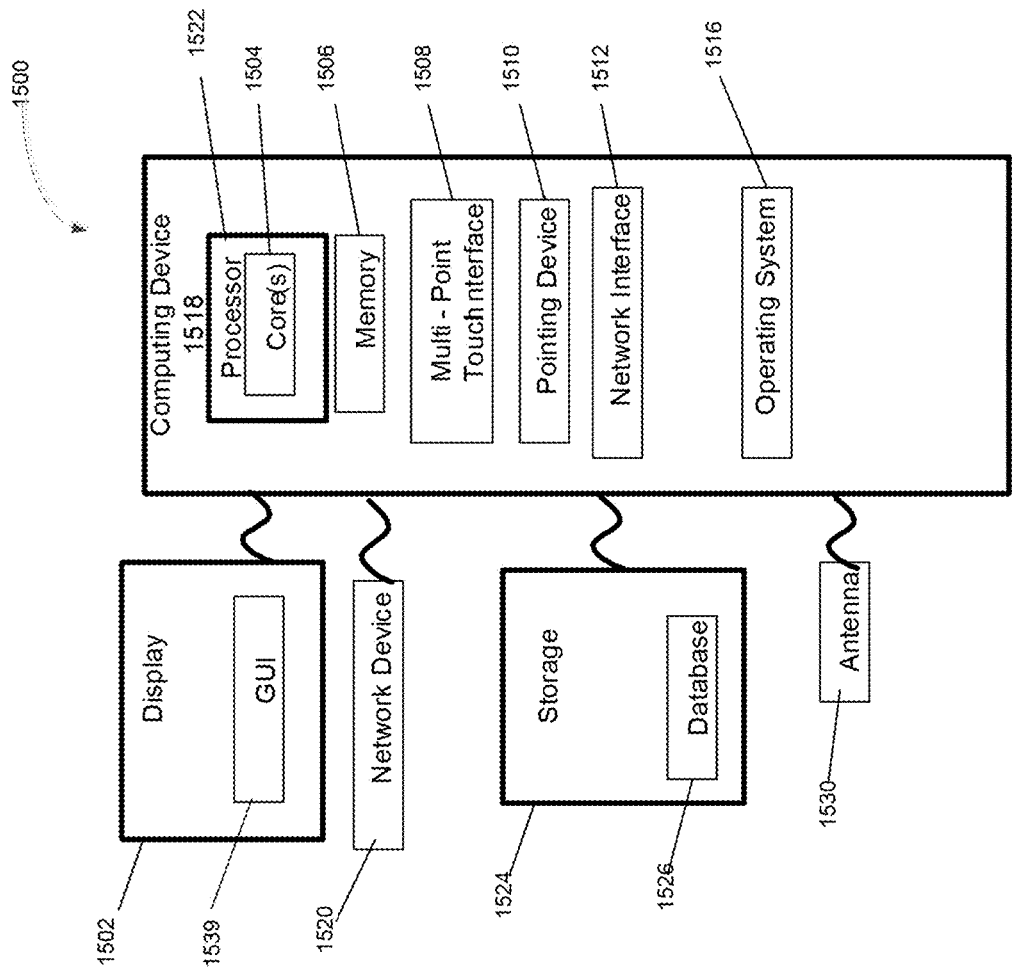
FIG. 15 schematically depicts an example computing module of the surgical robotic system in accordance with some embodiments.

FIG. 15 schematically depicts an example network environment 1500 that the surgical robotic system can be connected to in accordance with some embodiments. Computing device 1518 can be used to perform one or more steps of the methods provided by example embodiments. The computing device 1518 includes one or more non-transitory computer-readable media for storing one or more computer-executable instructions or software for implementing example embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 1506 included in the computing device 1518 can store computer-readable and computer-executable instructions or software for implementing example embodiments. The computing device 1518 also includes the processor 1522 and associated core 1504, for executing computer-readable and computer-executable instructions or software stored in the memory 1506 and other programs for controlling system hardware. The processor 1522 can be a single core processor or multiple core (1504) processor.

Memory 1506 can include a computer system memory or random access memory, such as DRAM, SRAM, EDO RAM, and the like. The memory 1506 can include other types of memory as well, or combinations thereof. A user can interact with the computing device 1518 through the display 1502, such as a touch screen display or computer monitor, which can display the graphical user interface (GUI) 1539. The display 1502 can also display other aspects, transducers and/or information or data associated with example embodiments. The computing module 18 can include other I/O devices for receiving input from a user, for example, a keyboard or any suitable multi-point touch interface 1508, a pointing device 1510 (e.g., a pen, stylus, mouse, or trackpad). The keyboard 1508 and the pointing device 1510 can be coupled to the visual display device 1512. The computing device 1518 can include other suitable conventional I/O peripherals.

The computing device 1518 can also include one or more storage devices 1524, such as a hard-drive, CD-ROM, or other computer readable media, for storing data and computer-readable instructions, applications, and/or software that implements example operations/steps of the processes as described herein, or portions thereof, which can be executed on processor 1522 and displayed on display 1512. Example storage devices 1524 can also store one or more databases for storing any suitable information required to implement example embodiments. The databases can be updated by a user or automatically at any suitable time to add, delete or update one or more items in the databases. Example storage devices 1524 can store one or more databases 1526 for storing provisioned data, and other data/information used to implement example embodiments of the systems and methods described herein.

The computing devices 1518 can include a network interface 1512 configured to interface via one or more network devices 1520 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 1512 can include a built-in network adapter, network interface card, PCMCIA network card, card bus network adapter, wireless network adapter, USB network adapter, modem or any other device suitable for interfacing the computing device 1518 to any type of network capable of communication and performing the operations described herein. Moreover, the computing device 1518 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 1518 can run any operating system 1516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In some embodiments, the operating system 1516 can be run in native mode or emulated mode. In some embodiments, the operating system 1516 can be run on one or more cloud machine instances.

The computing device 18 can also include an antenna 1530, where the antenna 1530 can transmit wireless transmissions a radio frequency (RF) front end and receive wireless transmissions from the RF front end.

While embodiments of the present disclosure are depicted and described herein, it will be clear to those skilled in the art that such embodiments are provided by way of example only. Numerous variations, changes, and substitutions will now occur to those skilled in the art without departing from the invention. It may be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A validation device, the validation device comprising:
a processor configured to or programmed to read one or more instructions held in memory to:
receive encrypted first data from a mining device, the first data including first position and first time data for a transportation vehicle;
receive or access second data including second position and second time data for the transportation vehicle;
determine validity of the first data by performing operations on the encrypted first data or on the encrypted first data and the second data to determine a relationship between the first data and the second data;
determine a validity of the first data by performing operations on the encrypted first data or on the encrypted first data and the second data to compare the encrypted first data and the second data;
assign a consensus score to the mining device based at least in part on the comparison of the first data and second data, the consensus score is further based at least in part on a volume of valid position and time data generated by the validation device;
apply a signature function to the encrypted first position and first time data, where the first position and first time data is determined to be valid, to obtain encrypted signed valid first position and first time data; and
publish the encrypted signed valid first position and first time data to a public transportation vehicle ledger.

2. The validation device of claim 1, wherein the processor is configured to receive the second position and second time data from a trusted mining device.

3. The validation device of claim 1, wherein the processor is further configured to:
receive the second position data and the second time data from a national or international repository of government regulated transportation vehicle data; and
generate expected position data associated with the transportation vehicle for the first time based at least in part on the received second position and time data,
wherein the comparison of first data and the second data includes comparing the encrypted first position and time data with the generated expected position data for the first time.

4. The validation device of claim 3, wherein the expected position and expected time data associated with the transportation vehicle corresponds to a data point of an expected trajectory of the transportation vehicle.

5. The validation device of claim 1, wherein the consensus score is further based at least in part on a multiplier associated with operating resources required for the transportation vehicle and a uniqueness value associated with the transportation vehicle.

6. The validation device of claim 5, wherein:
the multiplier is a first value when the operating resources are associated with a first type of transportation vehicle,
the multiplier is a second value when the operating resources are associated with a second type of transportation vehicle, and
the first value is greater than the second value when the operating resources associated with the first type of transportation vehicle are greater than the operating resources associated with the second type of transportation vehicle.

7. The validation device of claim 5, wherein the uniqueness value is based at least in part on an unplanned path that the transportation vehicle takes between a point of origin and a point of destination.

8. The validation device of claim 5, wherein the uniqueness value is based at least in part on an emergency associated with the transportation vehicle.

9. The validation device of claim 5, wherein the uniqueness value is based at least in part on a manifest associated with the transportation vehicle.

10. The validation device of claim 5, wherein the processor is further configured to generate a token based at least in part on the uniqueness value of the transportation vehicle.

11. The validation device of claim 1, wherein the processor is further configured to:
publish the consensus score to the public transportation vehicle ledger.

12. The validation device of claim 1, wherein the processor is configured to transmit the encrypted first data for validation to be published to a public blockchain.

13. A non-transitory computer-readable medium storing computer-executable instructions stored therein, which when executed by at least one processor, cause the at least one processor to perform the operations of:
receiving encrypted first data from a mining device, the first data including first position and first time data for a transportation vehicle;
receiving or accessing second data including second position and second time data for the transportation vehicle;
determining validity of the first data by performing operations on the encrypted first data or on the encrypted first data and the second data to determine a relationship between the first data and the second data;
determining a validity of the first data by performing operations on the encrypted first data or on the encrypted first data and the second data to compare the encrypted first data and the second data;
assigning a consensus score to the mining device based at least in part on the comparison of the first data and second data, the consensus score is further based at least in part on a volume of valid position and time data generated by the at least one processor;
applying a signature function to the encrypted first position and first time data, where the first position and first time data is determined to be valid, to obtain encrypted signed valid first position and first time data; and
publishing the encrypted signed valid first position and first time data to a public transportation vehicle ledger.

14. The non-transitory computer-readable medium of claim 13, wherein the processor is configured to receive the second position and second time data from a trusted mining device.

15. The non-transitory computer-readable medium of claim 13, wherein the processor is configured to:
receive the second position data and the second time data from a national or international repository of government regulated transportation vehicle data; and
generate expected position data associated with the transportation vehicle for the first time based at least in part on the received second position and time data,
wherein the comparison of first data and the second data includes comparing the encrypted first position and time data with the generated expected position data for the first time.

16. The non-transitory computer-readable medium of claim 15, wherein the expected position and expected time data associated with the transportation vehicle corresponds to a data point of an expected trajectory of the transportation vehicle.

17. The non-transitory computer-readable medium of claim 13, wherein the consensus score is further based at least in part on a multiplier associated with operating resources required for the transportation vehicle and a uniqueness value associated with the transportation vehicle.

18. A validation method, the validation method comprising:
receiving, by a validation device, encrypted first data from a mining device, the first data including first position and first time data for a transportation vehicle;
receiving, by the validation device, or accessing second data including second position and second time data for the transportation vehicle;
determining, by the validation device, validity of the first data by performing operations on the encrypted first data or on the encrypted first data and the second data to determine a relationship between the first data and the second data;
determining, by the validation device, a validity of the first data by performing operations on the encrypted first data or on the encrypted first data and the second data to compare the encrypted first data and the second data;
assigning, by the validation device, a consensus score to the mining device based at least in part on the comparison of the first data and second data, the consensus score is further based at least in part on a volume of valid position and time data generated by the validation device;
applying, by the validation device, a signature function to the encrypted first position and first time data, where the first position and first time data is determined to be valid, to obtain encrypted signed valid first position and first time data; and
publishing, by the validation device, the encrypted signed valid first position and first time data to a public transportation vehicle ledger.

\* \* \* \* \*